(12) United States Patent
Matsubayashi et al.

(10) Patent No.: US 8,735,009 B2
(45) Date of Patent: May 27, 2014

(54) CONTROL UNIT FOR FUEL-CELL POWER GENERATION APPARATUS, AND CONTROL METHOD, CONTROL PROGRAM AND COMPUTER-READABLE RECORD MEDIUM WITH CONTROL PROGRAM FOR THE SAME

(75) Inventors: Shigeaki Matsubayashi, Nara (JP); Masataka Ozeki, Osaka (JP); Yoshikazu Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 1576 days.

(21) Appl. No.: 11/631,412

(22) PCT Filed: Jul. 5, 2005

(86) PCT No.: PCT/JP2005/012387
§ 371 (c)(1),
(2), (4) Date: Jan. 3, 2007

(87) PCT Pub. No.: WO2006/006445
PCT Pub. Date: Jan. 19, 2006

(65) Prior Publication Data
US 2008/0038604 A1 Feb. 14, 2008

(30) Foreign Application Priority Data

Jul. 13, 2004 (JP) ................................ 2004-205631

(51) Int. Cl.
*H01M 8/04* (2006.01)
(52) U.S. Cl.
USPC ........... 429/428; 429/429; 429/430; 429/433; 429/437; 429/440
(58) Field of Classification Search
None
See application file for complete search history.

(56) References Cited

U.S. PATENT DOCUMENTS 5,432,710 A * 7/1995 Ishimaru et al. .............. 705/412

FOREIGN PATENT DOCUMENTS

EP 0568822 A2 11/1993
JP 2-245453 10/1990
(Continued)

OTHER PUBLICATIONS

Entchev E., "Residential fuel cell energy systems performance optimization using soft computing techniques", 2003, Journal of Power Sources 118, 212-217.*

(Continued)

*Primary Examiner* — Kwang Han
(74) *Attorney, Agent, or Firm* — Wenderoth, Lind & Ponack, L.L.P.

(57) ABSTRACT

A control unit operates a fuel-cell power generation apparatus efficiently according to power consumption and supplied hot-water heat consumption which are different in each home. A generated-power command-pattern creation section creates a plurality of generated-power command patterns which are obtained from a combination of a start time and a stop time of the fuel-cell power generation apparatus, based on a power-consumption prediction value. A hot-water storage-tank heat-quantity calculation section calculates a stored hot-water heat quantity for a predetermined period in a hot-water storage tank, based on a supplied hot-water heat-consumption prediction. A fuel-cell system-energy calculation section calculates fuel-cell system energy which indicates the energy of a fuel required in hot-water supply equipment and electricity required in electric equipment when the fuel-cell power generation apparatus is operated in each generated-power command pattern. Additionally, an optimum command-pattern selection section operates the fuel-cell power generation apparatus in a generated-power command pattern which minimizes the fuel-cell system energy.

10 Claims, 12 Drawing Sheets

(56) References Cited

FOREIGN PATENT DOCUMENTS

| | | |
|---|---|---|
| JP | 2002-190309 | 7/2002 |
| JP | 2002-318006 | 10/2002 |
| JP | 2003-61245 | 2/2003 |
| JP | 2004-116857 | 4/2004 |
| JP | 2005-12906 | 1/2005 |
| JP | 2005-26010 | 1/2005 |
| JP | 2005-44714 | 2/2005 |
| JP | 2005-276797 | 10/2005 |

OTHER PUBLICATIONS

Supplementary European Search Report issued Jun. 30, 2009 in counterpart European Application No. 05758228.
Evgueniy Entchev, "Residential fuel cell energy systems performance optimization using "soft computing" techniques", Journal of Power Sources, Elsevier, Amsterdam, NL, vol. 118, No. 1-2, May 25, 2003, pp. 212-217, XP004425684, ISSN: 0378-7753.
Syunichi Amari, New Development in Neural Networks, Saience-Sha Co., 1994, pp. 73-86.

* cited by examiner

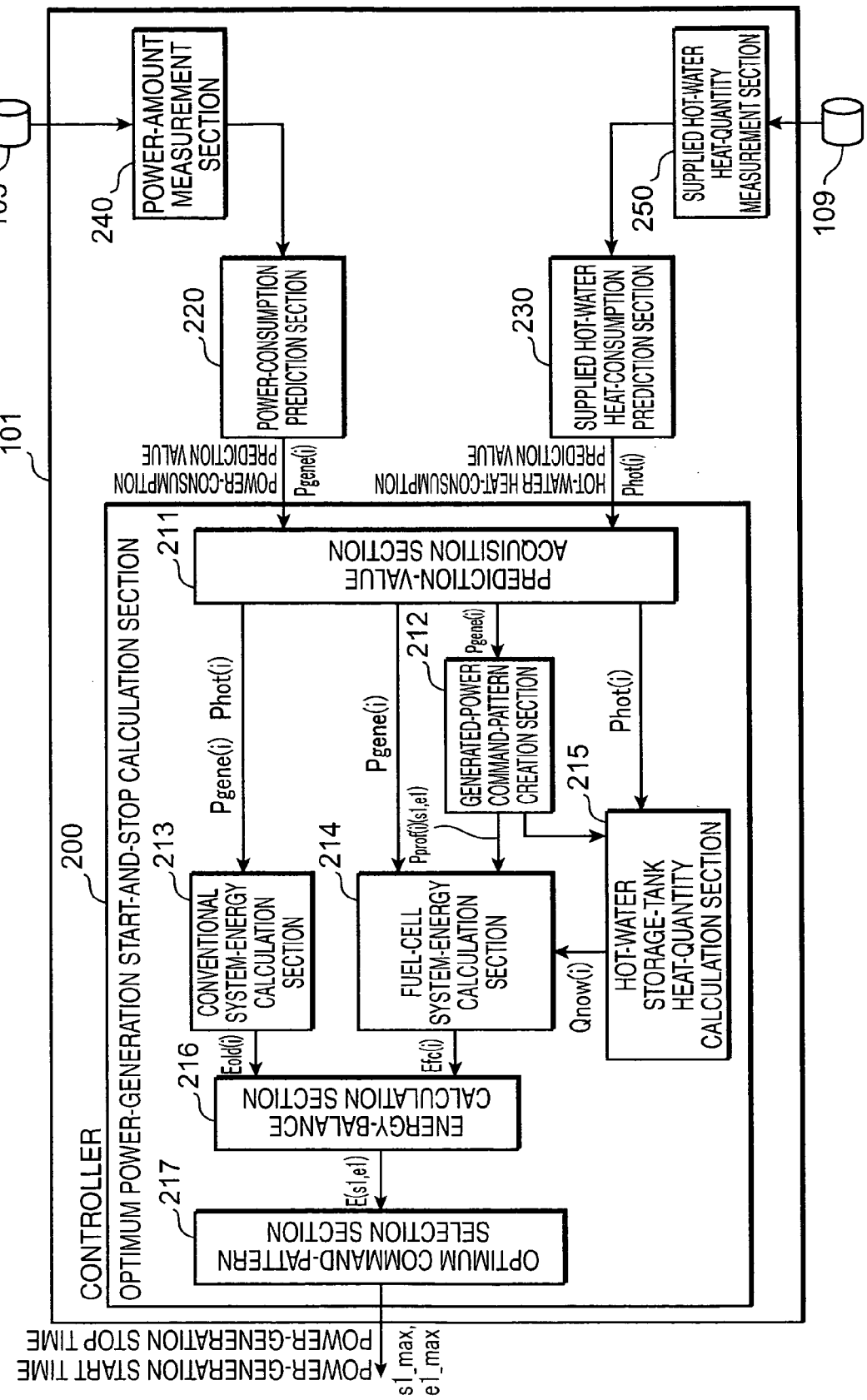

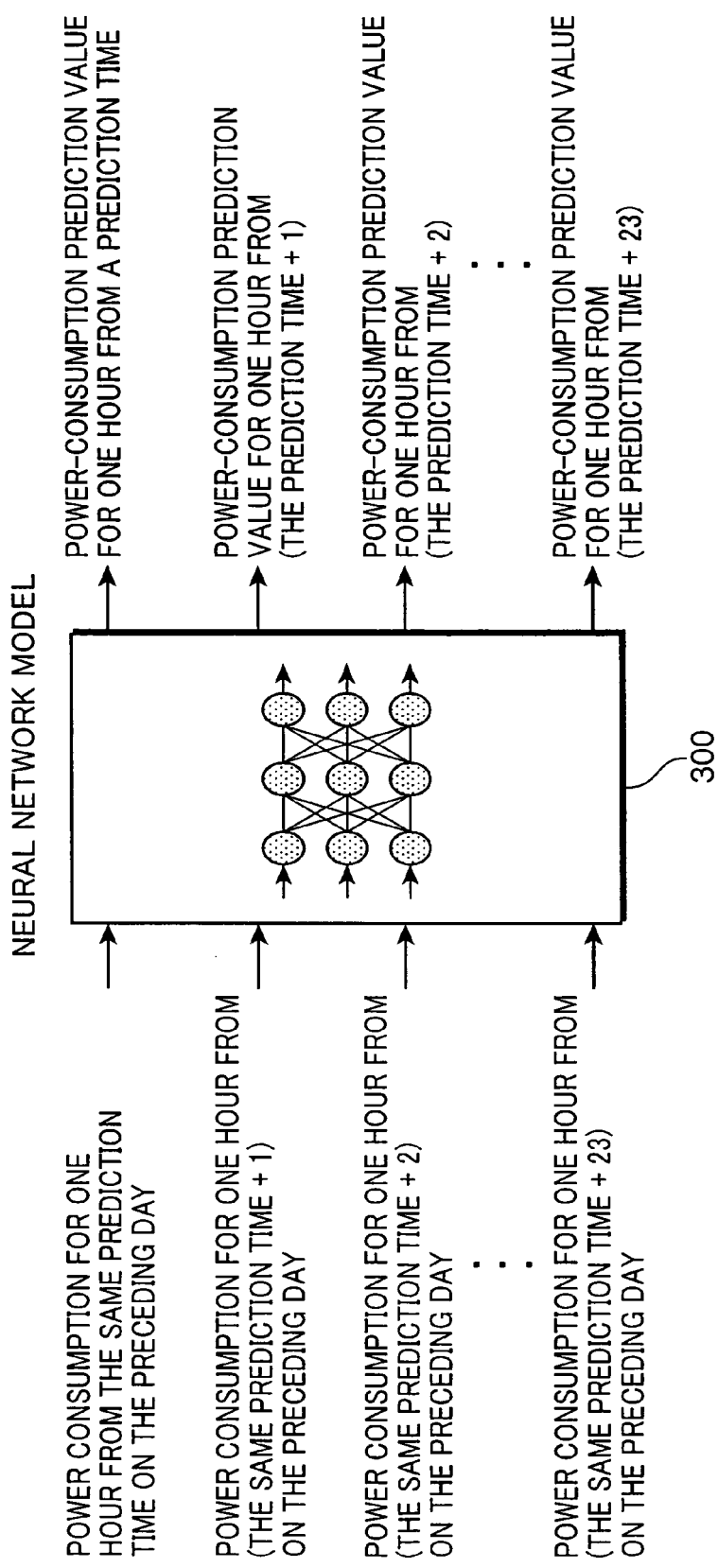

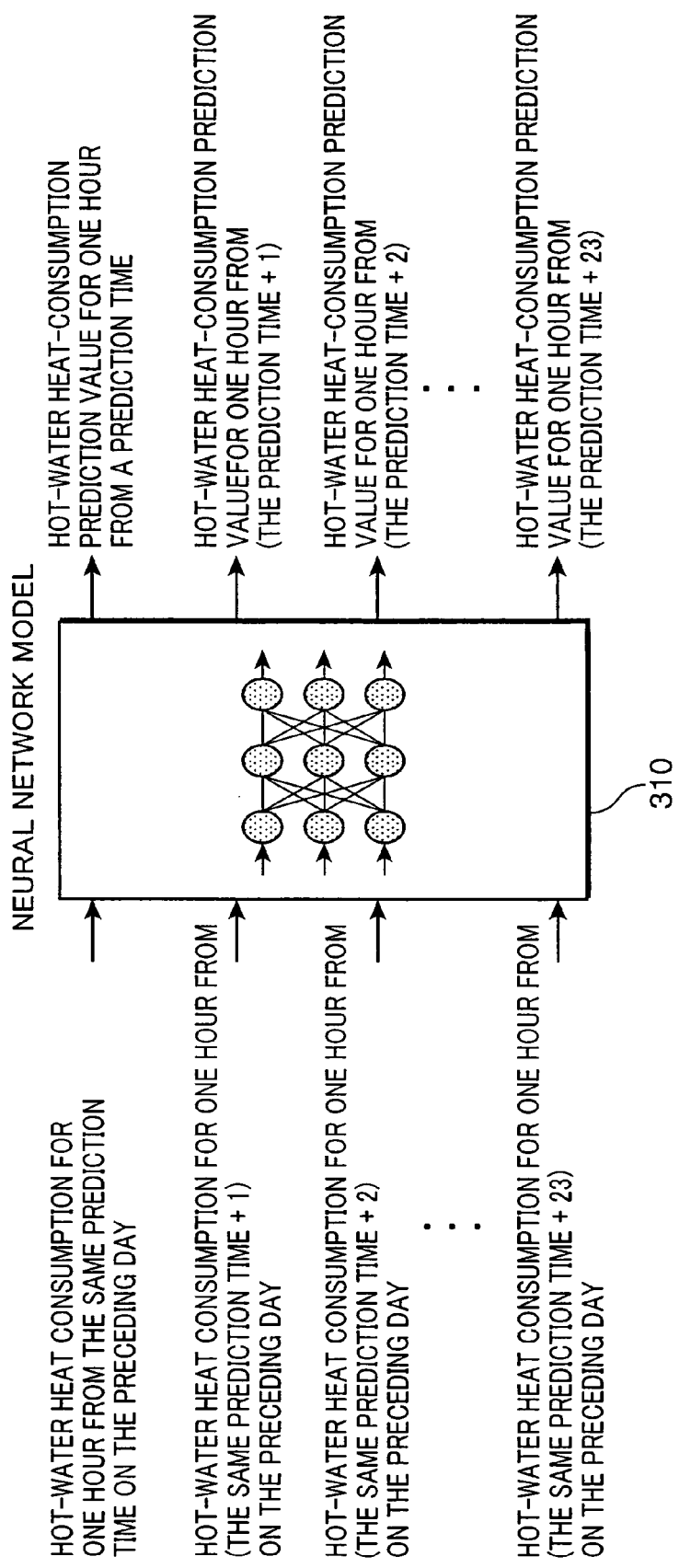

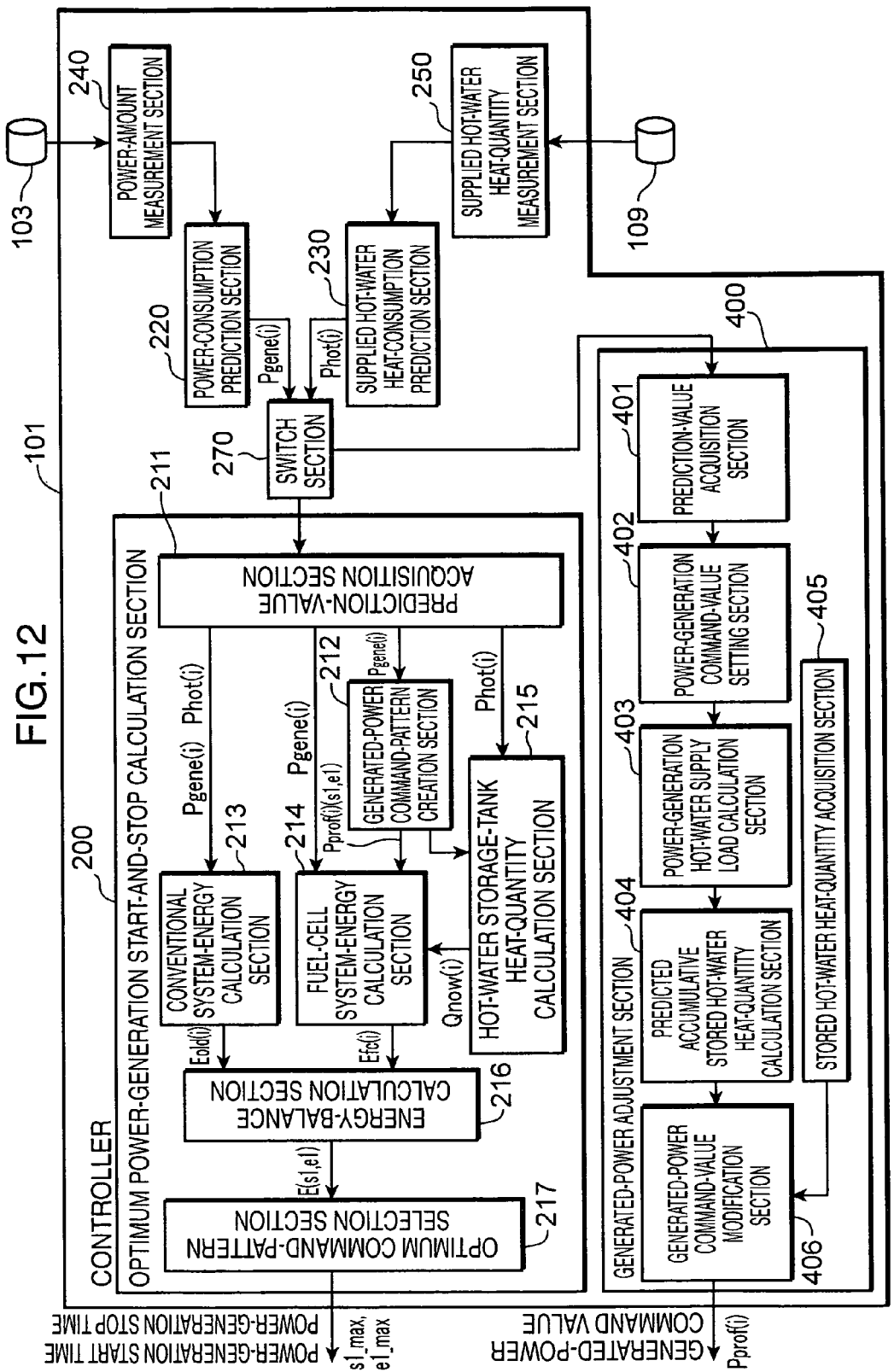

CONTROL UNIT FOR FUEL-CELL POWER GENERATION APPARATUS, AND CONTROL METHOD, CONTROL PROGRAM AND COMPUTER-READABLE RECORD MEDIUM WITH CONTROL PROGRAM FOR THE SAME

BACKGROUND OF THE INVENTION

1. Technical Field

The present invention relates to a control unit for a fuel-cell power generation apparatus which generates electric power and supplies it to electric equipment, and using simultaneously generated heat, supplies hot water to hot-water supply equipment. For the same purpose, it also relates to a control method, a control program, and a computer-readable record medium in which a control program is recorded.

2. Background Art

Conventionally, a fuel-cell power generation apparatus has been known which, using a fuel gas, generates electricity in a fuel battery and supplies electric power and hot water. In order to enhance energy efficiency by making good use of electric power and hot water supplied by such a fuel-cell power generation apparatus, it is desirable that the power generated by a fuel battery be equivalent to the power used by electric equipment. Desirably, the concurrently generated hot water should also be equal to the quantity of hot water used by hot-water supply equipment. Therefore, in a conventional fuel-cell power generation apparatus, a method is proposed of measuring and managing the power consumption or hot-water consumption of each home and controlling the power generated by a fuel battery.

For example, Patent Document 1 proposes the method of measuring hot water (i.e., a supplied hot-water heat quantity) used by hot-water supply equipment in each house, predicting a supplied hot-water heat consumption, and controlling the power to be generated so that the supplied hot-water heat quantity becomes equal to the supplied hot-water heat consumption. Besides, in Patent Document 2, the power consumption is predicted beforehand by executing a simulation, and according to this prediction value, the output generated by a fuel battery is efficiently controlled.

Patent Document 1: Japanese Patent Laid-Open No. 2002-318006 specification

Patent Document 2: Japanese Patent Laid-Open No. 2003-61245 specification

SUMMARY OF THE INVENTION

However, in the above described conventional control methods for a fuel-cell power generation apparatus, only either a supplied hot-water heat consumption or a power consumption which is spent in a home is taken into account. Therefore, if the power to be generated is controlled in consideration of only a supplied hot-water heat consumption, the generated power cannot be equivalent to the power used by electric equipment. For example, if the generated power is greater than the power consumption, then an inefficient conversion into heat may be forced, resulting in a drop in efficiency. On the other hand, if the generated power is controlled taking only a power consumption into account, the generated supplied hot-water heat quantity cannot be equal to the supplied hot-water heat consumption used by hot-water supply equipment. For example, if the quantity of used hot water is smaller, a hot-water storage tank is filled with hot water. The heat generated afterward is emitted outside, and thus, it is supposed to be disposed of. Besides, if the hot-water storage tank is filled with hot water, the fuel-cell power generation apparatus has to be fully halted so that heat will not be generated any longer. When it is started again, a rising loss is caused, thus deteriorating the energy-saving capability.

In order to resolve the above described disadvantages, it is an object of the present invention to provide a control unit, a control method, a control program and a computer-readable record medium with a control program on record, for a fuel-cell power generation apparatus, which are capable of operating the fuel-cell power generation apparatus efficiently according to a power consumption and a supplied hot-water heat consumption which are different in each home, and realizing the saving of energy.

A control unit for a fuel-cell power generation apparatus according to the present invention which generates electric power and heat using a fuel, supplies the electric power to electric equipment, and also uses the heat to supply hot water to hot-water supply equipment, comprising: a power-amount measuring means for measuring a power consumption consumed by the electric equipment; a power-consumption predicting means for predicting a future power consumption for a predetermined period from a predetermined time, based on the power consumption measured by the power-amount measuring means; a supplied hot-water heat-quantity measuring means for measuring a supplied hot-water heat consumption consumed by the hot-water supply equipment; a supplied hot-water heat-consumption predicting means for predicting a future supplied hot-water heat consumption for a predetermined period from a predetermined time, based on the supplied hot-water heat consumption measured by the supplied hot-water heat-quantity measuring means; a generated-power command-pattern creating means for, based on a power-consumption prediction value predicted by the power-consumption predicting means, creating a plurality of generated-power command patterns which are obtained from a combination of a start time and a stop time of the fuel-cell power generation apparatus; a hot-water storage-tank heat-quantity calculating means for, based on a supplied hot-water heat-consumption prediction value predicted by the supplied hot-water heat-consumption predicting means, calculating a stored hot-water heat quantity for the predetermined period in a hot-water storage tank which stores warmed water using the heat generated simultaneously with the power generation and supplies the warmed water to the hot-water supply equipment; a fuel-cell system-energy calculating means for, based on the plurality of generated-power command patterns created by the generated-power command-pattern creating means, the stored hot-water heat quantity calculated by the hot-water storage-tank heat-quantity calculating means and the power-consumption prediction value predicted by the power-consumption predicting means, if the fuel-cell power generation apparatus is operated in each generated-power command pattern, calculating fuel-cell system energy which indicates the energy of the fuel required in the hot-water supply equipment and electricity required in the electric equipment; and a fuel-cell operating means for, in terms of the fuel-cell system energy in each of the plurality of generated-power command patterns which is calculated by the fuel-cell system-energy calculating means, operating the fuel-cell power generation apparatus in the generated-power command pattern which minimizes the fuel-cell system energy.

According to this configuration, a power consumption consumed by the electric equipment is measured, and based on the measured power consumption, a future power consumption for a predetermined period from a predetermined time is predicted. Then, a supplied hot-water heat consumption consumed by the hot-water supply equipment is measured, and based on the measured supplied hot-water heat consumption, a future supplied hot-water heat consumption for a predetermined period from a predetermined time is predicted. Based on a power-consumption prediction value, a plurality of generated-power command patterns are created which are obtained from a combination of a start time and a stop time of the fuel-cell power generation apparatus, and based on a supplied hot-water heat-consumption prediction value, a stored hot-water heat quantity for the predetermined period in a hot-water storage tank which stores warmed water using the heat generated simultaneously with the power generation and supplies the warmed water to the hot-water supply equipment is calculated. Based on the plurality of generated-power command patterns, the stored hot-water heat quantity and the power-consumption prediction value, if the fuel-cell power generation apparatus is operated in each generated-power command pattern, fuel-cell system energy is calculated which indicates the energy of the fuel required in the hot-water supply equipment and electricity required in the electric equipment. In terms of the fuel-cell system energy in each of the plurality of generated-power command patterns, the fuel-cell power generation apparatus is operated in the generated-power command pattern which minimizes the fuel-cell system energy.

According to the present invention, in terms of the fuel-cell system energy calculated in each of the plurality of generated-power command patterns obtained from a combination of a start time and a stop time of the fuel-cell power generation apparatus, the generated-power command pattern which minimizes the fuel-cell system energy is acquired. At the corresponding start time, the fuel-cell power generation apparatus is started, and it is stopped at the corresponding stop time. Therefore, the fuel-cell power generation apparatus can be efficiently operated according to a power consumption and a supplied hot-water heat consumption which are different in each home. This makes it possible to realize the saving of energy.

The objects, characteristics, aspects and advantages of the present invention will be more obvious in the following detailed description and attached drawings.

BRIEF DESCRIPTION OF THE DRAWINGS

FIG. 2 is a block diagram, showing the configuration of a controller shown in FIG. 1.

FIG. 3 is an illustration, showing the configuration of a neural network model for predicting a power consumption in a power-consumption prediction section of FIG. 2.

FIG. 4 is an illustration, showing the configuration of a neural network model for predicting a supplied hot-water heat consumption in a supplied hot-water heat-consumption prediction section of FIG. 2.

FIG. 12 is a block diagram, showing the configuration of a controller according to a fourth embodiment.

DETAILED DESCRIPTION OF THE INVENTION

Figure 1:
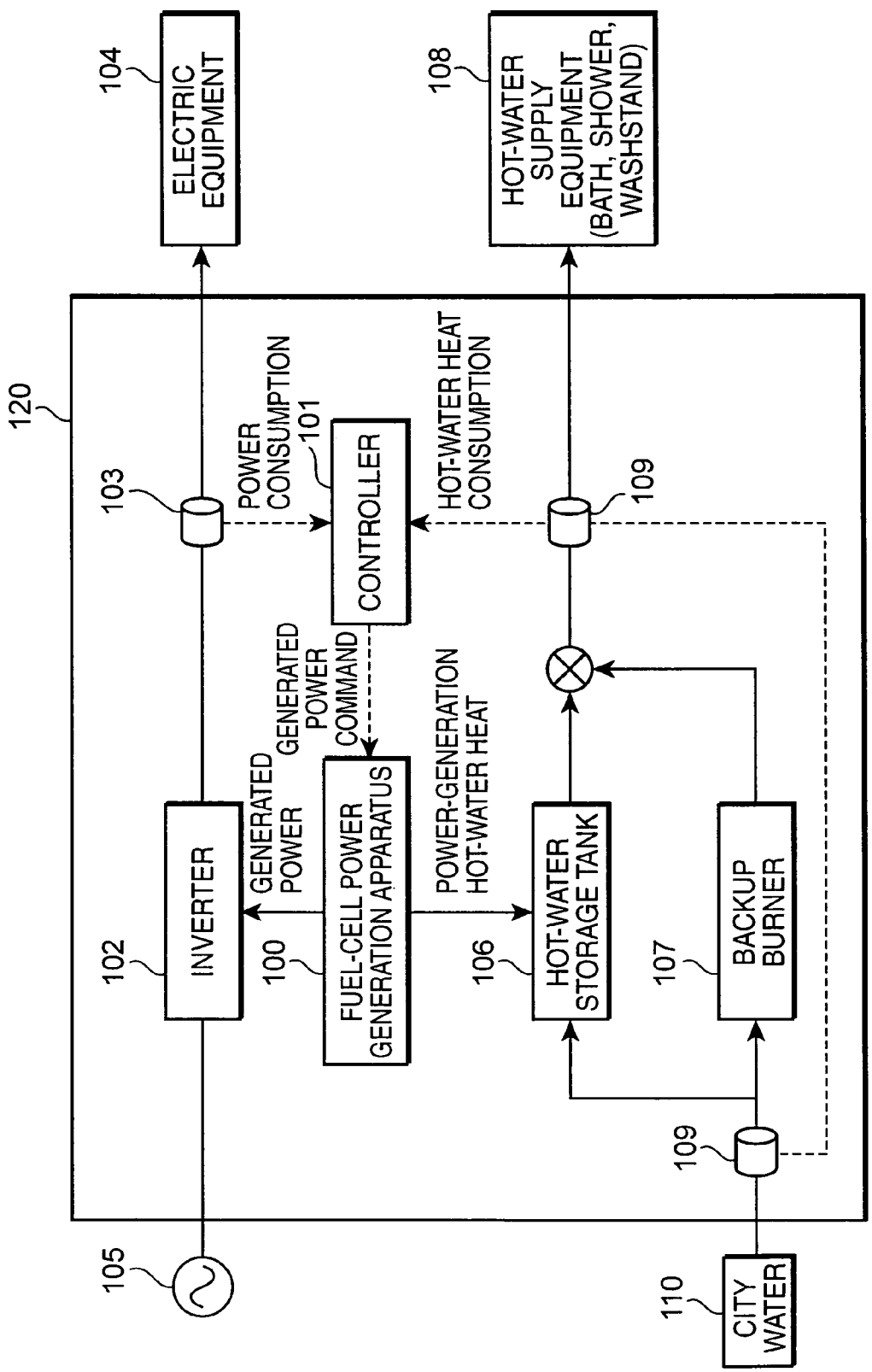
FIG. 1 is a block diagram, showing the whole configuration of a fuel-cell power generation system according to the present invention.

Hereinafter, embodiments of the present invention will be described on the basis of the attached drawings. In each figure, component elements are given the same reference characters and numerals as long as they are identical, and thus, their description is omitted.

First Embodiment

FIG. 1 is a block diagram, showing the whole configuration of a fuel-cell power generation system according to the present invention. A fuel-cell power generation system 120 shown in FIG. 1 is configured by a fuel-cell power generation apparatus 100, a controller 101, an inverter 102, a wattmeter 103, a hot-water storage tank 106, a backup burner 107, and a supplied hot-water calorimeter 109.

To an electric power system in a home, there are connected the fuel-cell power generation apparatus 100, the inverter 102, electric equipment 104, and a commercial power source 105. The wattmeter 103 measures electric power used by the electric equipment 104. The electric equipment 104 is, for example, a household electrical appliance such as a refrigerator and a washing machine. It includes various types of equipment in which electricity is used.

To a hot-water supply system in a home, there are connected the fuel-cell power generation apparatus 100, the hot-water storage tank 106, the backup burner 107, hot-water supply equipment 108 and city water 110. The hot-water supply equipment 108 is, for example, equipment such as a bath, a shower and a washstand in the case where a resident uses hot water. The supplied hot-water calorimeter 109 takes the quantity and temperature of hot water supplied to the hot-water supply equipment 108 and the temperature of the city water 110. Then, it measures the heat quantity equivalent to a hot-water supply load which is used in the hot-water supply equipment 108. Hereinafter, this hot-water supply load heat quantity is called a supplied hot-water heat consumption.

The wattmeter 103 and the supplied hot-water calorimeter 109 are connected to the controller 101. A power consumption of the electric equipment 104 is sent from the wattmeter 103 to the controller 101, and a supplied hot-water heat consumption of the hot-water supply equipment 108 is sent from the supplied hot-water calorimeter 109 to the controller 101. The controller 101 is connected to the fuel-cell power generation apparatus 100. A generated-power command is outputted from the controller 101 to the fuel-cell power generation apparatus 100, and according to the generated-power command, the fuel-cell power generation apparatus 100 generates power.

The fuel-cell power generation apparatus 100 prompts hydrogen given from a fuel such as city gas to react with atmospheric oxygen. Thereby, it converts chemical energy into electric energy to generate power. The power generated by the fuel-cell power generation apparatus 100 is supplied to the inverter 102, and it is supplied from the inverter 102 to the electric equipment 104. If the power consumption used in the electric equipment 104 is greater than the generated power, the inverter 102 purchases electric power (i.e., the purchase of power) from the commercial power source 105, so that this shortage can be compensated. In contrast, the generated power is greater than the power consumption, the inverter 102 sells the remainder of the generated power (i.e., the sale of power) to the commercial power source 105. Incidentally, unless the commercial power source 105 permits the sale of power, then the remaining power is, for example, converted into a supplied hot-water heat quantity, using a heater or the like in the hot-water storage tank 106. In such a way, the remainder is supposed to be disposed of.

In addition, at the same time that it generates power, the fuel-cell power generation apparatus 100 generates heat. This heat is designed to be used as the heat for supplied hot water from the power generation, and thus, it is stored as hot water in the hot-water storage tank 106. In response to a user's request, the hot water stored in the hot-water storage tank 106 runs from the hot-water supply equipment 108. At this time, unless the requested hot water is stored in the hot-water storage tank 106, the backup burner 107 produces hot water and offers it to the hot-water supply equipment 108. The hot water in the hot-water storage tank 106 is considered to run short when the fuel-cell power generation apparatus 100 generates a small amount of power because the electric power spent in the electric equipment 104 is not large, or when the supplied hot-water heat consumption used in the hot-water supply equipment 108 is extremely great.

In contrast, there is a case where the fuel-cell power generation apparatus 100 generates a great amount of power because the electric power spent in the electric equipment 104 is extremely large, or the supplied hot-water heat consumption used in the hot-water supply equipment 108 is extremely small. Then, the quantity of the power-generation supplied hot-water heat becomes relatively large, so that the hot-water storage tank 106 can be filled. In this case, the power-generation supplied hot-water heat has to be emitted outside and disposed of, or the fuel-cell power generation apparatus 100 has to be fully halted so that such power-generation supplied hot-water heat will not be generated any longer. When it is started again, a rising loss or the like is caused.

FIG. 2 is a block diagram, showing the configuration of the controller 101 shown in FIG. 1. The controller 101 shown in FIG. 2 includes a power-amount measurement section 240, a power-consumption prediction section 220, a supplied hot-water heat-quantity measurement section 250, a supplied hot-water heat-consumption prediction section 230, and an optimum power-generation start-and-stop calculation section 200.

The power-amount measurement section 240 measures, using the wattmeter 103, a power consumption which is used in the electric equipment 104. Then, it acquires it as a power consumption per hour and transmits it to the power-consumption prediction section 220. The power-consumption prediction section 220 accumulates, as a history, each one-hour power consumption transmitted from the power-amount measurement section 240. Then, it predicts a future power consumption for a predetermined period from a predetermined time in a unit of one hour. The power-consumption prediction section 220 holds a hierarchical neural-network model for executing a prediction. Incidentally, the details of a neural network model, such as its characteristics and learning method, are disclosed in "New Development in Neural Network, pp. 73-86, written and edited by Shun-ichi Amari, SAIENSU-SHA Co., 1994". Hence, their description is omitted.

FIG. 3 is an illustration, showing the configuration of a neural network model used in the power-consumption prediction section 220 of FIG. 2. A neural network model 300 is a hierarchical neural-network model and has three layers of an input layer, an intermediate layer and an output layer. This neural network model 300 is configured by setting a prediction value as an output parameter, and setting data which has a strong cause-and-effect relation with the prediction value as an input parameter. This has to be done for the purpose of improving the precision of a prediction. Therefore, the output parameter is set to a power-consumption prediction value on that day while the input parameter is set to a power consumption on the day before which is considered to have a strong cause-and-effect relation with the prediction value.

The power-consumption prediction section 220 according to this embodiment executes a prediction for 24 hours from a prediction time in the one-hour unit. Therefore, as the output parameter of the neural network model 300, twenty-four pieces of data are used which are "a power-consumption prediction value for one hour from the prediction time", "a power-consumption prediction value for one hour from (the prediction time+1)", . . . , "a power-consumption prediction value for one hour from (the prediction time+23)". On the other hand, as the input parameter, twenty-four pieces of data are used which are "a power consumption for one hour from the same prediction time on the preceding day", "a power consumption for one hour from (the same prediction time+1) on the preceding day", . . . , "a power consumption for one hour from (the same prediction time+23) on the preceding day".

Herein, the power consumption for one hour from the prediction time is the amount of power used from zero o'clock to one o'clock when the prediction time is zero o'clock. If a neural network model is configured in this way, then at the point of time when it runs past zero o'clock on the day for which a prediction should be executed, a power consumption on the previous day is inputted. Thereby, each power consumption after the prediction time in the day can be predicted in units of one hour (i.e. predicted for 24 hours).

Furthermore, in the neural network model 300, in order to make a prediction more precise, a learning is executed by securing data which includes pairs of power-consumption prediction values and really-measured power-consumption values for several days. Thereby, the weighting factor of the neural network model 300 can be modified, resulting in a power consumption being precisely predicted in each home.

Incidentally, in order to improve the precision of a prediction, desirably, data used for learning should be sorted out. For example, when a prediction is executed for weekdays, if data on weekdays is also used as the learning data, the prediction will be more effective. Besides, in an initial state where no learning is executed in the neural network model 300, data necessary for learning should be secured over several days. Then, a prediction needs to be executed after at least one learning has been executed.

Using the supplied hot-water calorimeter 109, the supplied hot-water heat-quantity measurement section 250 measures a supplied hot-water heat consumption used in the hot-water supply equipment 108. Then, it acquires it as a supplied hot-water heat consumption for one hour and transmits it to the supplied hot-water heat-consumption prediction section 230. The supplied hot-water heat-consumption prediction section 230 accumulates, as a history, each one-hour supplied hot-water heat consumption which is transmitted from the supplied hot-water heat-consumption prediction section 230. Then, it predicts, in a unit of one hour, a future supplied hot-water heat consumption for a predetermined period from a predetermined time. Similarly to the power-consumption prediction section 220, the supplied hot-water heat-consumption prediction section 230 holds a hierarchical neural-network model for executing a prediction.

The operation of the supplied hot-water heat-consumption prediction section 230 is basically the same as that of the power-consumption prediction section 220. However, a neural network model which is used in the supplied hot-water heat-consumption prediction section 230 is like the one shown in FIG. 4. A neural network model 310 is a hierarchical neural-network model and has three layers of an input layer, an intermediate layer and an output layer. In this neural-network model 310, an output parameter is a supplied hot-water heat-consumption prediction value on that day while an input parameter is a supplied hot-water heat consumption on the day before which is considered to have a strong cause-and-effect relation with the prediction value.

The supplied hot-water heat-consumption prediction section 230 according to this embodiment executes a prediction for 24 hours from a prediction time in the one-hour unit. Therefore, as the output parameter of the neural network model 310, twenty-four pieces of data are used which are "a supplied hot-water heat-consumption prediction value for one hour from the prediction time", "a supplied hot-water heat-consumption prediction value for one hour from (the prediction time+1)", . . . , "a supplied hot-water heat-consumption prediction value for one hour from (the prediction time+23)". On the other hand, as the input parameter, twenty-four pieces of data are used which are "a supplied hot-water heat consumption for one hour from the same prediction time on the preceding day", "a supplied hot-water heat consumption for one hour from (the same prediction time+1) on the preceding day", . . . , "a supplied hot-water heat consumption for one hour from (the same prediction time+23) on the preceding day".

Herein, the supplied hot-water heat consumption for one hour from the prediction time is a supplied hot-water heat quantity used from zero o'clock until one o'clock when the prediction time is zero o'clock. If a neural network model is configured in this way, then at the point of time when it runs past zero o'clock on the day for which a prediction should be executed, a supplied hot-water heat consumption on the previous day is inputted. Thereby, each supplied hot-water heat consumption after the prediction time in the day can be predicted in units of one hour (i.e. predicted for 24 hours).

In this way, the power-consumption prediction section 220 accumulates a power consumption acquired from the power-amount measurement section 240. Then, it executes a learning using the neural-network model. Similarly, the supplied hot-water heat-consumption prediction section 230 accumulates a supplied hot-water heat consumption acquired from the supplied hot-water heat-quantity measurement section 250. Then, it executes a learning using the neural-network model. Consequently, when a prediction is executed, a future power consumption and a future supplied hot-water consumption for a predetermined period from a predetermined time can be predicted.

In addition, using the neural-network model, a future power consumption and a future supplied hot-water heat consumption are predicted over 24 hours from zero o'clock. Thereby, a generated-power command pattern can be created for a whole day. This makes it possible to operate the fuel-cell power generation apparatus 100 in the generated-power command pattern which is most suitable for each day.

On the basis of a power-consumption prediction value as a future power consumption for a predetermined period from a predetermined time in each one-hour unit which is obtained from the power-consumption prediction section 220 and a supplied hot-water heat-consumption prediction value as a future supplied hot-water heat consumption for a predetermined period from a predetermined time in each one-hour unit which is obtained from the supplied hot-water heat-consumption prediction section 230, the optimum power-generation start-and-stop calculation section 200 calculates a power-generation start time and a power-generation stop time for minimizing the primary-energy consumption. Then, it transmits them as a generated-power command to the fuel-cell power generation apparatus 100.

Next, an operation will be described of the optimum power-generation start-and-stop calculation section 200. The optimum power-generation start-and-stop calculation section 200 is configured by a prediction-value acquisition section 211, a generated-power command-pattern creation section 212, a conventional system-energy calculation section 213, a fuel-cell system-energy calculation section 214, a hot-water storage-tank heat-quantity calculation section 215, an energy-balance calculation section 216, and an optimum command-pattern selection section 217.

The prediction-value acquisition section 211 acquires a power-consumption prediction value Pgene(i) [kWh] which is predicted by the power-consumption prediction section 220 and a supplied hot-water heat-consumption prediction value Phot(i) [kWh] which is predicted by the supplied hot-water heat-consumption prediction section 230. Reference character i denotes the time, and thus, for example, Pgene(5) indicates a power-consumption prediction value for one hour from five o'clock.

The generated-power command-pattern creation section 212 acquires a power-consumption prediction value from the prediction-value acquisition section 211. Then, it creates a generated-power command pattern Pprof(i)(s1,e1) [kWh]. Herein, s1 and e1 designate a start time and a stop time of the fuel-cell power generation apparatus 100, respectively. The generated-power command pattern Pprof(i)(s1,e1) is created in the following expression (1).

$$Pprof(i)(s1, e1) = \begin{cases} Pgene(i) & [i = s1 \sim e1] \\ 0 & [i = 0 \sim s1-1, e1+1 \sim 23] \end{cases} \quad (1)$$

Figure 5A:
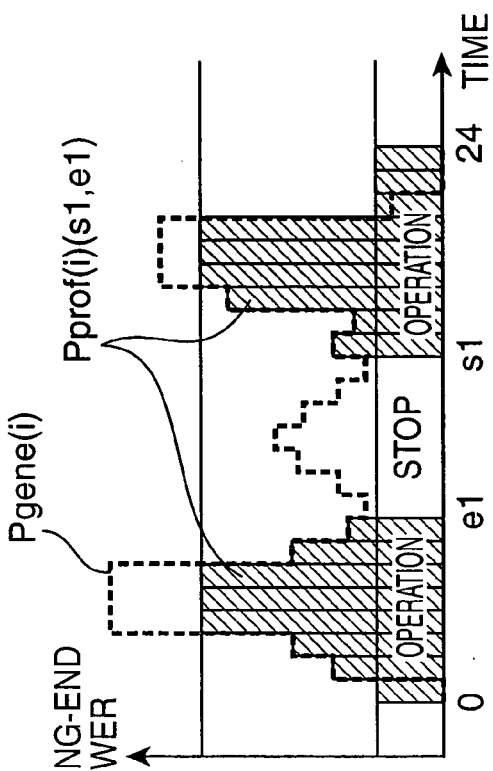
FIG. 5 is a graphical representation, showing the relation between a power-consumption prediction value, a start time, a stop time and a generated-power command pattern.
Figure 5B:
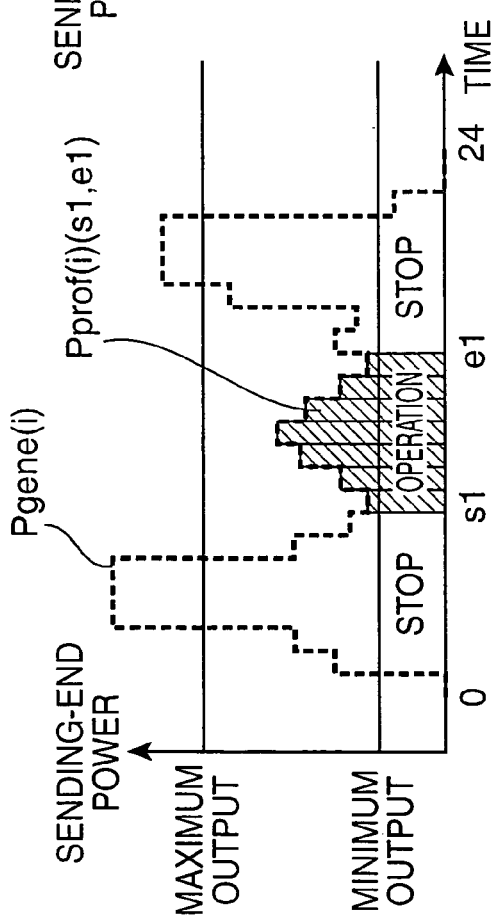

FIG. 5 is a graphical representation, showing the relation between a power-consumption prediction value, the start time s1, the stop time e1 and a generated-power command pattern. FIG. 5A shows an example of the generated-power command pattern when the start time is earlier than the stop time, or in the case of (s1<e1). FIG. 5B shows an example of the generated-power command pattern when the start time is later than the stop time, or in the case of (s1>e1). In FIG. 5A and FIG. 5B, the vertical axis expresses a sending-end power and the horizontal axis represents a time.

In FIG. 5A, from the time s1 to the time e1, the fuel-cell power generation apparatus 100 operates along the power-consumption prediction value. Thus, the generated-power command pattern is coincident with the power-consumption prediction value. Between zero o'clock and s1 (0~s1-1), and between e1 and twenty-four o'clock (e1+1~23), the fuel-cell power generation apparatus 100 is kept at a stop. Hence, the generated-power command pattern is set at zero.

In contrast, in FIG. 5B, from the time s1 to twenty-four o'clock and from zero o'clock to the time e1, the fuel-cell power generation apparatus 100 is operated. In the interval when the power-consumption prediction value exceeds the maximum output of the fuel-cell power generation apparatus 100, it becomes the maximum output. On the other hand, in the interval when the power-consumption prediction value is below the minimum output of the fuel-cell power generation apparatus 100, it becomes the minimum output. Thereby, the generated-power command pattern becomes the one shown in the figure. In other words, the maximum output of the sending-end power is predetermined, so that the fuel-cell power generation apparatus 100 cannot supply the electric power above the maximum output. Therefore, if the power-consumption prediction value exceeds the maximum output, the generated-power command pattern is modified to the maximum output. In the same way, the minimum output of the sending-end power is predetermined, so that the fuel-cell power generation apparatus 100 cannot supply the electric power below the minimum output. Therefore, if the power-consumption prediction value falls short of the minimum output, the generated-power command pattern is modified to the minimum output.

Hence, the number of such generated-power command patterns is equal to that of combinations of the start time s1 and the stop time e1. For example, if the start time s1 is five o'clock and the stop time e1 is twenty-two o'clock, the generated-power command pattern can be expressed like Pprof(i)(5,22) [kWh]. The generated-power command pattern is a combination of the start time s1 and the stop time e1, and thus, 24×24=576 kinds can be created. Incidentally, if the start time is equal to the stop time (or s1=e1), the fuel-cell power generation apparatus 100 keeps operating without coming to a halt.

On the basis of the power-consumption prediction value Pgene(i) [kWh] and the supplied hot-water heat-consumption prediction value Phot(i) [kWh] which are sent from the prediction-value acquisition section 211, the conventional system-energy calculation section 213 calculates conventional system energy Eold(i) [kWh] which is energy indicating the amount of power and the amount of gas before the fuel-cell power generation apparatus 100 is installed. Before the fuel-cell power generation apparatus 100 is provided, electricity supplied via the commercial power source 105 from an ordinary electric-power company is used as the electric power for use. As the supplied hot-water heat quantity for use, an ordinary gas hot-water supply equipment converts gas into heat, and this heat is used. Therefore, in order to calculate the conventional system energy Eold(i) [kWh] from the viewpoint of primary energy, using an electricity generation efficiency which indicates the percentage of electric power generated by a power company and a hot-water supply-equipment efficiency in a gas hot-water supply equipment, it is calculated in the following expression (2).

$$E\text{old}(i)=P\text{gene}(i)/\text{electricity generation efficiency}+P\text{hot}(i)/\text{hot-water supply-equipment efficiency} \quad (2)$$

In this expression (2), as the power consumption and the supplied hot-water heat consumption, the power-consumption prediction value and the supplied hot-water heat-consumption prediction value are used, respectively. Hence, as the conventional system energy Eold(i) [kWh], over a future predetermined period from a predetermined time when a prediction is executed, the energy before the installation of the fuel-cell power generation apparatus 100 is calculated in a unit of one hour. In general, the electricity generation efficiency is approximately 40% and the hot-water supply-equipment efficiency is about 80% to 90%.

On the basis of the supplied hot-water heat-consumption prediction value Phot(i) [kWh] sent from the prediction-value acquisition section 211, the hot-water storage-tank heat-quantity calculation section 215 calculates a hot-water storage-tank heat quantity Qnow(i) [kWh] which indicates a transition for each period in the heat quantity of the hot-water storage tank 106. First, the hot-water storage-tank heat-quantity calculation section 215 calculates a radiated-heat quantity Qloss(i) [kWh] by which heat is radiated in the hot-water storage tank 106, using the following expression (3).

$$Q\text{loss}(i)=Q\text{now}(i-1)\times\text{hot-water storage-tank radiation coefficient} \quad (3)$$

In this expression (3), the hot-water storage-tank radiation coefficient indicates the percentage of the quantity of heat which is radiated for one hour from the hot-water storage tank. Thus, it depends upon the thermal-insulation capability of hot-water storage. Commonly, the hot-water storage-tank radiation coefficient is around 1 to 2%.

On the basis of the radiated-heat quantity Qloss(i) [kWh], the generated-power command pattern Pprof(i)(s1,e1) [kWh] and the supplied hot-water heat-consumption prediction value Phot(i) [kWh], the hot-water storage-tank heat-quantity calculation section 215 calculates the hot-water storage-tank heat quantity Qnow(i) [kWh] which indicates a transition in the heat quantity of the hot-water storage tank 106, using the following expression (4).

$$Q\text{now}(i)=Q\text{now}(i-1)+P\text{prof}(i)(s1,e1)/FC\text{ power-generation efficiency}\times FC\text{ hot-water supply efficiency}-P\text{hot}(i)-Q\text{loss}(i) \quad (4)$$

In this expression (4), the FC power-generation efficiency is the percentage of generated power which is acquired from the gas used for generating electricity in the fuel-cell power generation apparatus 100. Similarly, the FC hot-water supply efficiency is the percentage of a generated-heat quantity which is acquired from the gas. These values are usually determined according to the performance of the fuel-cell power generation apparatus 100. Strictly peaking, they are values which vary according to the operation state of a fuel battery. In general, the weaker the generated power becomes, the smaller those values both become, in other words, the lower the efficiency becomes. In the above described expression (4), both the FC power-generation efficiency and the FC hot-water supply efficiency are set in advance by calculating their values through an experiment or the like. In general, the FC power-generation efficiency is approximately 30% and the FC hot-water supply efficiency is about 40%.

Next, if the hot-water storage-tank heat quantity Qnow(i) [kWh] exceeds the maximum stored hot-water heat quantity, the waste heat needs to be disposed of. Thus, the hot-water storage-tank heat-quantity calculation section 215 calculates it again, using the following expression (5).

$$Q\text{now}(i)=Q\text{max}[Q\text{now}(i)\geq Q\text{max}] \quad (5)$$

In this expression (5), Qmax is the maximum stored hot-water heat quantity. If the hot-water storage-tank heat quantity Qnow(i) [kWh] is above Qmax, Qmax is maintained and the excess heat is emitted. Generally, the maximum stored hot-water heat quantity Qmax is a value which depends heavily upon the capacity of a hot-water storage tank. Hence, it is preset by calculating its value through an experiment or the like.

The hot-water storage-tank heat quantity Qnow(i) [kWh] obtained by the above described calculation is supposed to be calculated in a unit of one hour over a future predetermined period from a predetermined time when a prediction is executed.

The fuel-cell system-energy calculation section 214 acquires the generated-power command pattern Pprof(i)(s1, e1) [kWh] from the generated-power command-pattern creation section 212. Then, it acquires the power-consumption prediction value Pgene(i) [kWh] from the prediction-value acquisition section 211 and acquires the hot-water storage-tank heat quantity Qnow(i) [kWh] from the hot-water storage-tank heat-quantity calculation section 215. Thereby, it calculates fuel-cell system energy Efc(i) [kWh] which is energy after the fuel-cell power generation apparatus 100 is installed. As such fuel-cell system energy, the following energy should be taken into account, the quantity of gas supplied to the fuel-cell power generation apparatus 100, a backup-gas consumption spent by the backup burner 107 which is operated when a supplied hot-water heat consumption is needed at a user's request while heat is not kept in the hot-water storage tank 106, and the amount of electric power purchased from the commercial power source 105 when the power used by the electric equipment 104 is greater than the generated power.

First, the fuel-cell system-energy calculation section 214 calculates a backup-gas consumption spent by the backup burner 107, using the following expression (6).

$$\text{back up-gas consumption }(i) = \begin{cases} -Qnow(i)/\text{hot-water supply-equipment efficiency} & [Qnow(i) < 0] \\ 0 & [Qnow(i) \geq 0] \end{cases} \quad (6)$$

In this expression (6), the hot-water supply-equipment efficiency is the same as the hot-water supply-equipment efficiency used in the expression (2). When a backup-gas consumption is generated, the hot-water storage-tank heat quantity Qnow(i) [kWh] calculated by the hot-water storage-tank heat-quantity calculation section 215 is negative. Hence, only in the case of Qnow<0, a backup-gas consumption is generated. In the case of Qnow≤0, an adequate heat quantity is stored in the hot-water storage tank 106. Therefore, there is no need for a backup-gas consumption, and thus, its value is zero.

Next, the fuel-cell system-energy calculation section 214 calculates the amount of electric power purchased from the commercial power source 105, using the following expression (7).

$$\text{purchased power }(i) = \begin{cases} (Pgene(i) - Pprof(i)(s1, e1))/ \\ \text{electricity generation efficiency} & [Pgene(i) \geq Pprof(i)(s1, e1)] \\ 0 & [Pgene(i) < Pprof(i)(s1, e1)] \end{cases} \quad (7)$$

In this expression (7), the electricity generation efficiency is the same as the electricity generation efficiency used in the expression (2). Herein, the amount of purchased power needs to be calculated which is necessary when the fuel-cell power generation apparatus 100 is operated in the generated-power command pattern Pprof(i)(s1,e1) [kWh]. Hence, the purchased-power amount can be calculated, using the difference between the generated-power command pattern Pprof(i)(s1, e1) [kWh] and the power-consumption prediction value Pgene(i) [kWh]. In the case of Pgene(i)≥Pprof(i)(s1,e1), the amount of generated power falls short, and thus, the purchase of power is estimated to take place. In contrast, in the case of Pgene(i)<Pprof(i)(s1,e1), the purchase of power is not executed, and thus, the purchased-power amount is zero. The purchased-power amount obtained by the above described calculation is supposed to be calculated in a unit of one hour over a future predetermined period from a predetermined time when a prediction is executed.

Based on the backup-gas consumption and the purchased-power amount in the above described expression (6) and expression (7), the fuel-cell system-energy calculation section 214 calculates the fuel-cell system energy Efc(i) [kWh], using the following expression (8).

$$Efc(i) = Pprof(i)(s1,e1)/FC \text{ power-generation efficiency} + \text{backup-gas consumption}(i) + \text{purchased-power amount}(i) \quad (8)$$

In this expression (8), the FC power-generation efficiency is the same as the FC power-generation efficiency used in the expression (4). Using the generated-power command pattern Pprof(i)(s1,e1) [kWh] and the FC power-generation efficiency, the quantity of gas supplied to the fuel-cell power generation apparatus 100 can be calculated by Pprof(i)(s1, e1)/FC power-generation efficiency. The fuel-cell system energy Efc(i) [kWh] obtained by the above described calculation is supposed to be calculated in a unit of one hour over a future predetermined period from a predetermined time when a prediction is executed.

In this way, conventional system energy and fuel-cell system energy are converted into primary energy. Hence, the energy (i.e., the conventional system energy) which is equivalent to the quantity of gas necessary for the hot-water supply equipment 108 and the amount of power necessary for the electric equipment 104 when the fuel-cell power generation apparatus 100 is not operated, as well as the energy (i.e., the fuel-cell system energy) which is equivalent to the quantity of gas necessary for the hot-water supply equipment 108 and the amount of power necessary for the electric equipment 104 when the fuel-cell power generation apparatus 100 is operated in each of several generated-power command patterns, can be calculated as energy of the same dimension.

The energy-balance calculation section 216 acquires the conventional system energy Eold(i) [kWh] from the conventional system-energy calculation section 213. Then, it acquires the fuel-cell system energy Efc(i) [kWh] from the fuel-cell system-energy calculation section 214, and calculates an energy balance E(s1,e1) [kWh]. The energy balance E(s1,e1) [kWh] is obtained by calculating, over a future predetermined period from a predetermined time when a prediction is executed, the difference between primary energy necessary before the fuel-cell power generation apparatus 100 is installed and primary energy necessary when the fuel-cell power generation apparatus 100 is operated in the generated-power command pattern Pprof(i)(s1,e1) [kWh]. It can be obtained using the following expression (9).

$$E(s1, e1) = \sum_{i=0}^{23} (Eold(i) - Efc(i)) - Estart \quad (9)$$

In this expression (9), E start is energy which is necessary when the fuel-cell power generation apparatus 100 is started. This is not supposed to contribute directly to the power to be generated, and thus, it is treated as loss energy. In this embodiment, its start and stop are assumed to be made once, so that only the energy for the single start is reduced. However, if some condition is changed for an operation to make the start and the stop several times, the energy which corresponds to the number of the starts needs to be decreased.

In this way, when the fuel-cell system energy is calculated, the energy necessary for a start of the fuel-cell power generation apparatus 100 is calculated beforehand. Then, it is added to the fuel-cell system energy. Thereby, taking into account the energy at the time when the fuel-cell power generation apparatus 100 is started, a more precise energy used by the fuel-cell power generation apparatus 100 can be calculated.

The energy balance E(s1,e1) [kWh] calculated by the energy-balance calculation section 216 represents an energy balance until twenty-four hours ahead when the fuel-cell power generation apparatus 100 operates on the condition of the start time S1 and the stop time e1. Why it is for the future twenty-four hours is because the power-consumption prediction section 220 and the supplied hot-water heat-consumption prediction section 230 execute a prediction until twenty-four hours ahead in this embodiment.

As already described, as the generated-power command pattern Pprof(i)(s1,e1) [kWh], there are as many patterns as the combinations of the start time S1 and the stop time e1 in the generated-power command-pattern creation section 212. In the same way, as the energy balance E(s1,e1) [kWh], there are as many balances as the combinations of the start time S1 and the stop time e1, because they correspond one to one to the generated-power command patterns. In this embodiment, 24×24=576 kinds are designed to be created. Besides, the fact that the energy balance E(s1,e1) [kWh] is a positive value and is also large means that because of the installation of the fuel-cell power generation apparatus 100, the energy is reduced and is also decreased largely. The greater that value becomes, the more advantageous the installation of the fuel-cell power generation apparatus 100 will be.

As already described in the operation of the hot-water storage-tank heat-quantity calculation section 215, if the hot-water storage-tank heat quantity Qnow(i) [kWh] exceeds the maximum stored hot-water heat quantity Qmax, the excess heat is emitted from the hot-water storage tank. In this case, the energy loss which corresponds to the waste heat is caused. Hence, in this case, the energy balance E(s1,e1) [kWh] is zero in accordance with the following expression (10).

$$\text{If } Qnow(i) \geq Qmax, E[s1,e1]=0 \quad (10)$$

The optimum command-pattern selection section 217 acquires energy balances E(s1,e1) [kWh] which are calculated by the energy-balance calculation section 216 and are as many as the number of the combinations of the start time s1 and the stop time e1. From them, it extracts a start time s1_max and a stop time e1_max which give the maximum energy balance E(s1,e1) [kWh]. Then, it sends it to the fuel-cell power generation apparatus 100. The fuel-cell power generation apparatus 100 accepts the start time s1_max and the stop time e1_max which are sent from the controller 101. When operating between the start time and the stop time, it operates so that the generated power becomes equal to the power consumption. This is a so-called electricity-oriented operation.

Using the start time s1_max and the stop time e1_max obtained in such an operation as described above, the fuel-cell power generation apparatus 100 is operated. This makes it possible to operate the fuel-cell power generation apparatus 100 using the minimum energy.

Herein, in this embodiment, the controller 101 corresponds to an example of the control unit; the power-amount measurement section 240, to an example of the power-amount measuring means; the power-consumption prediction section 220, to an example of the power-consumption predicting means; the supplied hot-water heat-quantity measurement section 250, to an example of the supplied hot-water heat-quantity measuring means; the supplied hot-water heat-consumption prediction section 230, to an example of the supplied hot-water heat-consumption predicting means; the generated-power command-pattern creation section 212, to an example of the generated-power command-pattern creating means; the hot-water storage-tank heat-quantity calculation section 215, to an example of the hot-water storage-tank heat-quantity calculating means; the fuel-cell system-energy calculation section 214, to an example of the fuel-cell system-energy calculating means; the energy-balance calculation section 216 and the optimum command-pattern selection section 217, to an example of the fuel-cell operating means; and the conventional system-energy calculation section 213, to an example of the conventional system-energy calculating means.

Figure 6:
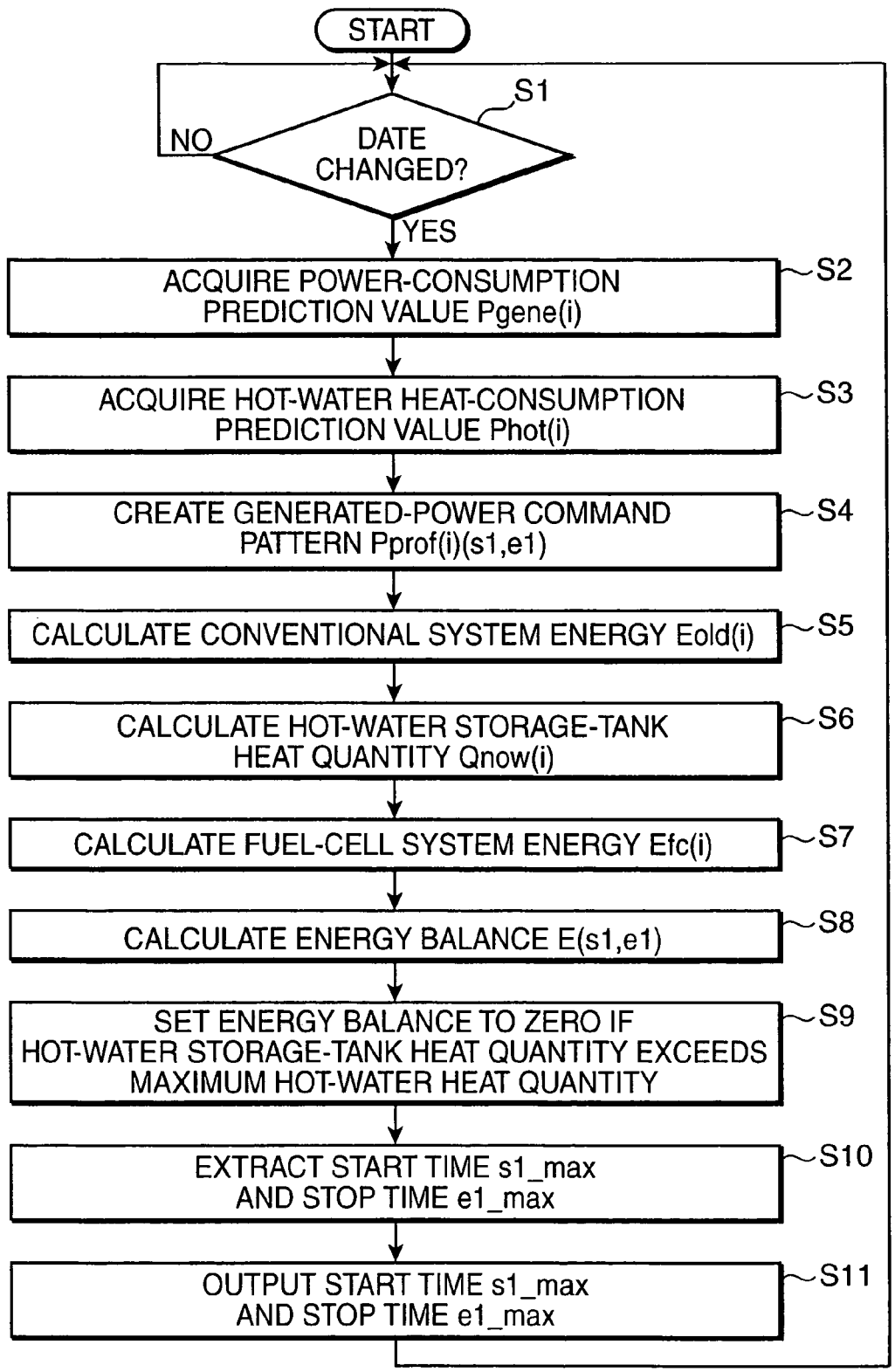
FIG. 6 is a flow chart, showing the operation of the controller according to a first embodiment shown in FIG. 2.

FIG. 6 is a flow chart, showing the operation of the controller 101 according to the first embodiment shown in FIG. 2. In the first embodiment, the energy is evaluated in a unit of one day, so that an optimum start time S1 and stop time e1 can be obtained. Thus, the prediction-value acquisition section 211 decides whether or not the time has come to zero o'clock in the morning on the following day (in a step S1). A prediction needs to be executed at zero o'clock, and if the date changes, the decision is made that the prediction can be updated. Herein, if the decision is made that the date remains unchanged so that the prediction cannot be updated (NO at the step S1), the processing comes into a standby state. Then, the processing of the step S1 is repeated.

If deciding that the date changes so that the prediction can be updated (YES at the step S1), the prediction-value acquisition section 211 acquires the power-consumption prediction value Pgene(i) [kWh] from the power-consumption prediction section 220 (in a step S2). Next, the prediction-value acquisition section 211 acquires the supplied hot-water heat-consumption prediction value Phot(i) [kWh] from the supplied hot-water heat-consumption prediction section 230 (in a step S3). The period of time for the prediction is one day, or twenty-four hours, and thus, the value of i is 0 to 23. Hence, the power-consumption prediction value and the supplied hot-water heat-consumption prediction value include a prediction value in each one-hour unit over the whole day. Thus, each of them is made up of twenty-four values.

Next, the generated-power command-pattern creation section 212 acquires the power-consumption prediction value from the power-consumption prediction section 220. Then, it creates a generated-power command pattern Pprof(i)(s1,e1) [kWh] (in a step S4). Herein, s1 is a start time of the fuel-cell power generation apparatus 100 and e1 is a stop time of the fuel-cell power generation apparatus 100. Each of them has a value of 0 to 23. The generated-power command pattern is a combination of the start time s1 and the stop time e1, and thus, 24×24=576 kinds can be created. Incidentally, if the start time is equal to the stop time (or s1=e1), the fuel-cell power generation apparatus 100 keeps operating without coming to a halt. Hence, the generated-power command pattern substantially includes 553 kinds, except for the overlapping ones.

Sequentially, the conventional system-energy calculation section 213 acquires the power-consumption prediction value Pgene(i) [kWh] and the supplied hot-water heat-consumption prediction value Phot(i) [kWh] from the prediction-value acquisition section 211. On the basis of these power-consumption prediction value Pgene(i) [kWh] and supplied hot-water heat-consumption prediction value Phot(i) [kWh], it calculates the conventional system energy Eold(i) [kWh] which is energy before the fuel-cell power generation apparatus 100 is installed (in a step S5). Specifically, the conventional system-energy calculation section 213 adds the value obtained by dividing the power-consumption prediction value by the electricity generation efficiency and the value obtained by dividing the supplied hot-water heat-consumption prediction value by the hot-water supply-equipment efficiency. Thereby, it obtains this addition value as the conventional system energy. The conventional system energy also includes such a value in each one-hour unit over the whole day, and thus, it is made up of twenty-four values.

Next, the hot-water storage-tank heat-quantity calculation section 215 calculates the hot-water storage-tank heat quantity Qnow(i) [kWh], based on the supplied hot-water heat-consumption prediction value Phot(i) [kWh] and the generated-power command pattern Pprof(i)(s1,e1) [kWh] (in a step S6). Specifically, the hot-water storage-tank heat-quantity calculation section 215 adds the hot-water storage-tank heat quantity at the time (i−1) to the value which is obtained by dividing the generated-power command pattern by the value obtained by multiplying the FC power-generation efficiency and the FC hot-water supply efficiency together. Thereby, it subtracts the supplied hot-water heat-consumption prediction value and the storage-tank radiated-heat quantity from this addition value. Thereby, it obtains the hot-water storage-tank heat quantity Qnow(i). Incidentally, if the hot-water storage-tank heat quantity Qnow(i) [kWh] is equal to, or above, the maximum stored hot-water heat quantity Qmax, the hot-water storage-tank heat quantity Qnow(i) [kWh] is equivalent to the maximum stored hot-water heat quantity Qmax. The hot-water storage-tank heat quantity also shifts in a unit of one hour and includes such a value over the whole day. Hence, it is made up of twenty-four values for each generated-power command pattern, and thus, as many kinds as the generated-power command patterns, or 576 kinds, are created.

Sequentially, on the basis of the generated-power command pattern Pprof(i)(s1,e1) [kWh], the power-consumption prediction value Pgene(i) [kWh] and the hot-water storage-tank heat quantity Qnow(i) [kWh], the fuel-cell system-energy calculation section 214 calculates the fuel-cell system energy Efc(i) [kWh] which is energy after the fuel-cell power generation apparatus 100 is installed (in a step S7).

Specifically, the fuel-cell system-energy calculation section 214 calculates the backup-gas consumption (i) by dividing the hot-water storage-tank heat quantity Qnow(i) by the hot-water supply-equipment efficiency. The fuel-cell system-energy calculation section 214 subtracts, from the power-consumption prediction value Pgene(i), the value obtained by dividing the generated-power command pattern Pprof(i)(s1, e1) by the electricity generation efficiency. Thereby, it calculates the purchased-power amount (i). Then, the fuel-cell system-energy calculation section 214 adds up the value obtained by dividing the generated-power command pattern Pprof(i)(s1,e1) by the FC power-generation efficiency, the backup-gas consumption (i) and the purchased-power amount (i). Thereby, it calculates the fuel-cell system energy Efc(i). The fuel-cell system energy also includes a value per hour over the full day, and thus, it is made up of twenty-four values for each generated-power command pattern. Hence, as many kinds as the generated-power command patterns, or 576 kinds, are created.

Next, the energy-balance calculation section 216 calculates the energy balance E(s1,e1) [kWh], based on the conventional system energy Eold(i) [kWh] and the fuel-cell system energy Efc(i) [kWh] (in a step S8). Specifically, the energy-balance calculation section 216 subtracts, from the conventional system energy Eold(i), the value obtained by adding the fuel-cell system energy Efc(i) and a rising loss in the fuel-cell power generation apparatus 100. Thereby, it calculates the energy balance E(s1,e1). As the energy balance E(s1,e1), one value is calculated for each generated-power command pattern, and thus, as many kinds as the generated-power command patterns, or 576 kinds, are created.

Sequentially, among the 576 kinds of energy balances E(s1,e1) [kWh] which are calculated at the step S8, in terms of the energy balances E(s1,e1) [kWh] which correspond to the case where the hot-water storage-tank heat quantity Qnow (i) [kWh] exceeds the maximum hot-water storage-tank heat quantity, the energy-balance calculation section 216 decides that an energy loss can be caused because of an inevitable emission of the heat. Then, it evaluates the energy balance as zero (i.e., E(s1,e1)=0) (in a step S9).

Next, from among the 576 kinds of energy balances E(s1, e1) [kWh] which are created at the step S7, the optimum command-pattern selection section 217 extracts the start time s1_max and the stop time e1_max which give the maximum energy balance (in a step S10).

Sequentially, the optimum command-pattern selection section 217 outputs these start time s1_max and stop time e1_max to the fuel-cell power generation apparatus 100 (in a step S11). The fuel-cell power generation apparatus 100 operates according to the start time s1_max and the stop time e1_max. In other words, it operates in the generated-power command pattern of Pprof(i)(s1_max,e1_max). This makes it possible to operate the fuel-cell power generation apparatus 100 using the minimum energy, so that the most efficient start and stop can be made.

As described above, according to the present invention, on the basis of the power-consumption prediction value from the power-consumption prediction section 220 and the supplied hot-water heat-consumption prediction value from the supplied hot-water heat-consumption prediction section 230, the optimum power-generation start-and-stop calculation section 200 can calculate the optimum start time s1_max and stop time e1_max for minimizing the energy in a unit of one day for the fuel-cell power generation apparatus 100, compared with a conventional system energy. Therefore, the fuel-cell power generation apparatus 100 can be most efficiently operated.

As described so far, a power consumption consumed by the electric equipment 104 is measured, and based on the measured power consumption, a future power consumption for a predetermined period from a predetermined time is predicted. Then, a supplied hot-water heat consumption consumed by the hot-water supply equipment 108 is measured, and based on the measured supplied hot-water heat consumption, a future supplied hot-water heat consumption for a predetermined period from a predetermined time is predicted. Based on a power-consumption prediction value, a plurality of generated-power command patterns are created which are obtained from a combination of a start time and a stop time of the fuel-cell power generation apparatus 100, and based on a supplied hot-water heat-consumption prediction value, a hot-water heat quantity (i.e., a hot-water storage-tank heat quantity) stored in the hot-water storage tank 106 is calculated. Based on the plurality of generated-power command patterns, the hot-water storage-tank heat quantity and the power-consumption prediction value, if the fuel-cell power generation apparatus 100 is operated in each generated-power command pattern, fuel-cell system energy is calculated which indicates the energy equivalent to the quantity of gas required in the hot-water supply equipment 108 and the amount of power required in the electric equipment 104. In terms of the fuel-cell system energy in each of the plurality of generated-power command patterns, the fuel-cell power generation apparatus 100 is operated in the generated-power command pattern which minimizes the fuel-cell system energy.

Therefore, in terms of the fuel-cell system energy calculated in each of the plurality of generated-power command patterns obtained from a combination of a start time and a stop time of the fuel-cell power generation apparatus 100, the generated-power command pattern which minimizes the fuel-cell system energy is acquired. At the corresponding start time, the fuel-cell power generation apparatus 100 is started, and it is stopped at the corresponding stop time. Therefore, the fuel-cell power generation apparatus 100 can be efficiently operated according to a power consumption and a supplied hot-water heat consumption which are different in each home. This makes it possible to realize the saving of energy.

Furthermore, on the basis of the power-consumption prediction value and the supplied hot-water heat-consumption prediction value, when the fuel-cell power generation apparatus 100 is not operated, the conventional system energy is calculated which indicates the energy equivalent to the quantity of gas necessary for the hot-water supply equipment 108 and the electricity necessary for the electric equipment 104. Then, the fuel-cell power generation apparatus 100 is operated, using the generated-power command pattern of the fuel-cell system energy which maximizes the value left after the fuel-cell system energy for each of the plurality of generated-power command patterns is subtracted from the conventional system energy.

Therefore, the fuel-cell system energy which indicates the energy equivalent to the quantity of gas necessary for the hot-water supply equipment 108 and the electricity necessary for the electric equipment 104 when the fuel-cell power generation apparatus 100 is operated in each of the plurality of generated-power command patterns, is subtracted from the conventional system energy which indicates the energy equivalent to the quantity of gas necessary for the hot-water supply equipment 108 and the electricity necessary for the electric equipment 104 when the fuel-cell power generation apparatus 100 is not operated. Then, the fuel-cell power generation apparatus 100 is operated in the generated-power command pattern of the fuel-cell system energy which maximizes the value left after this subtraction. Consequently, the fuel-cell power generation apparatus 100 can be more efficiently operated, taking into account the case where the fuel-cell power generation apparatus 100 is not operated.

Moreover, the power-consumption prediction section 220 and the supplied hot-water heat-consumption prediction section 230 execute a learning based upon a different power or supplied hot-water consumption in each home. As a result, it can be most efficiently operated, though each home has a different usage environment.

In addition, when the fuel-cell power generation apparatus 100 according to the present invention operates while receiving the start time and the stop time sent from the controller 101, it operates in accordance with the power consumption of the electric equipment 104. In short, it executes a so-called electricity-oriented operation. However, it may also operate in accordance with the supplied hot-water heat consumption of the hot-water supply equipment 108. This is called a heat-oriented operation and offers the same advantage.

Furthermore, the fuel-cell power generation system 120 according to the present invention includes the wattmeter 103 or the supplied hot-water calorimeter 109. However, the wattmeter 103 and the supplied hot-water calorimeter 109 may also be provided outside of the fuel-cell power generation system 120 so that only data can be acquired. Even in that case, needless to say, the desired advantage can be obtained.

Moreover, in this embodiment, the conventional system energy and the fuel-cell system energy are calculated, and the fuel-cell system energy is subtracted from the conventional system energy. Thereby, the energy balance is calculated. However, the present invention is not limited especially to this. The energy balance may also be calculated using only the fuel-cell system energy, without calculating the conventional system energy.

Incidentally, it is also possible to realize the present invention using a program and transfer this after recorded in a computer-readable record medium.

Second Embodiment

Next, a second embodiment of the present invention will be described. In the first embodiment, the start time s1 and the stop time e1 in accordance with the demand of power and the demand of supplied hot-water in each home are outputted to the fuel-cell power generation apparatus 100. Thereby, the fuel-cell power generation apparatus 100 is efficiently operated, so that energy can be saved. In contrast, in the second embodiment, the case where the fuel-cell power generation apparatus 100 is stopped when a hot-water storage tank fills is added to the evaluation of a calculation of the fuel-cell system energy.

Figure 7:
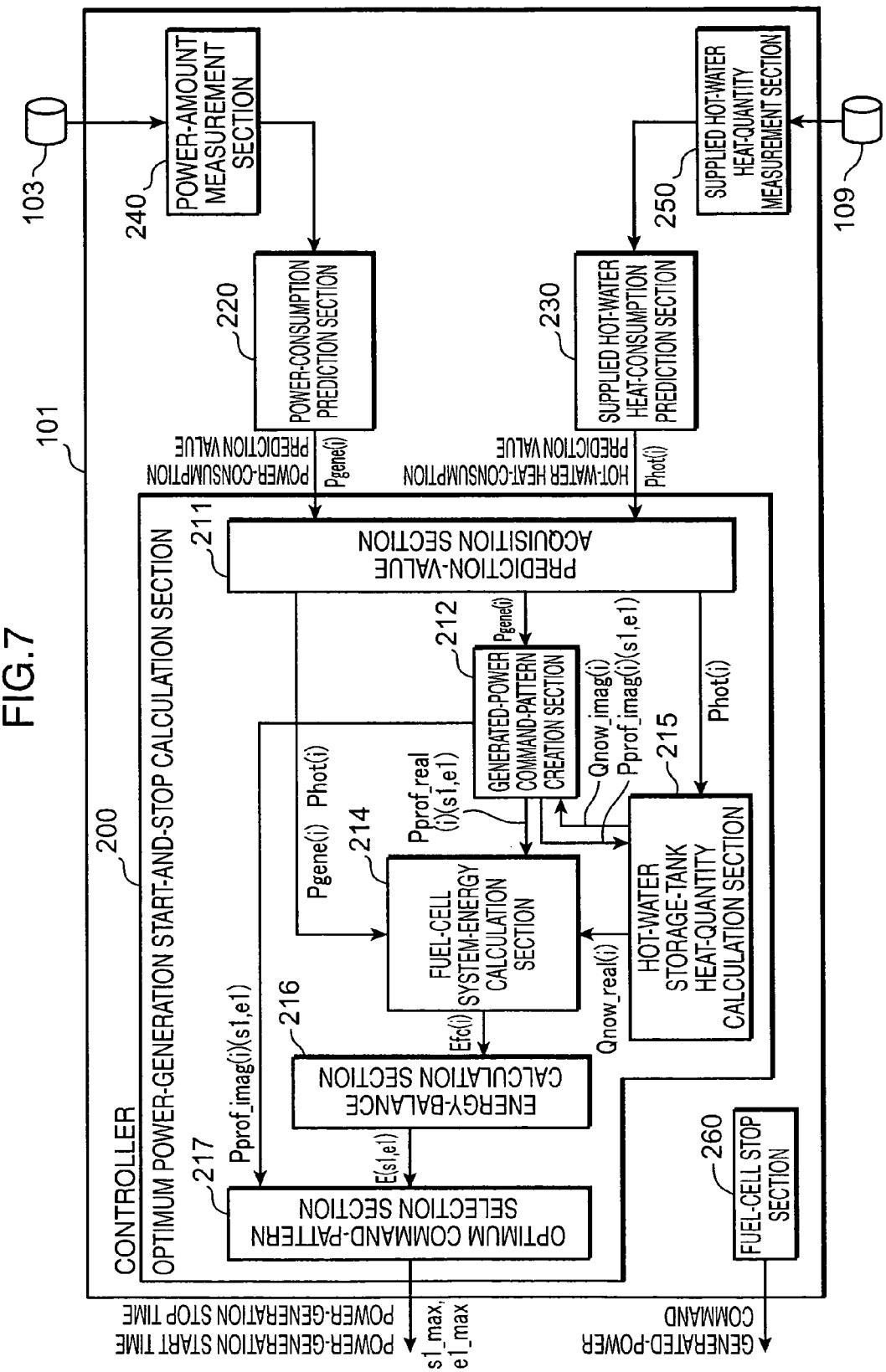
FIG. 7 is a block diagram, showing the configuration of a controller according to a second embodiment.

FIG. 7 is a block diagram, showing the configuration of a controller 101 according to the second embodiment. In FIG. 7, several component elements have the same configuration as those of the controller according to the first embodiment shown in FIG. 2, and thus, their description is omitted. Besides, the whole configuration of a fuel-cell power generation system according to the second embodiment is the same as that of FIG. 1.

The controller 101 includes an optimum power-generation start-and-stop calculation section 200, a power-consumption prediction section 220, a supplied hot-water heat-consumption prediction section 230, a power-amount measurement section 240, a supplied hot-water heat-quantity measurement section 250, and a fuel-cell stop section 260.

If the hot-water heat quantity stored in the hot-water storage tank 106 reaches a predetermined value, the fuel-cell stop section 260 halts the fuel-cell power generation apparatus 100. In the hot-water storage tank 106, a sensor is provided which measures the stored hot-water heat quantity of the hot-water storage tank 106. If the stored hot-water heat quantity outputted from this sensor reaches a predetermined value, the fuel-cell stop section 260 outputs, to the fuel-cell power generation apparatus 100, a generated-power command to stop the fuel-cell power generation apparatus 100. Herein, in this embodiment, the fuel-cell stop section 260 corresponds to an example of the stopping means.

The optimum power-generation start-and-stop calculation section 200 is configured by a prediction-value acquisition section 211, a generated-power command-pattern creation section 212, a fuel-cell system-energy calculation section 214, a hot-water storage-tank heat-quantity calculation section 215, an energy-balance calculation section 216, and an optimum command-pattern selection section 217.

The generated-power command-pattern creation section 212 acquires a power-consumption prediction value Pgene(i) [kWh] which is predicted by the power-consumption prediction section 220. Then, it creates a generated-power command pattern Pprof_imag(i)(s1,e1) which is designed to take no account of the fact that the fuel-cell power generation apparatus 100 starts to operate only at the start time s1 and stops operating only at the stop time e1, and the fuel-cell power generation apparatus 100 comes to a halt when the hot-water storage tank 106 is filled.

The hot-water storage-tank heat-quantity calculation section 215 acquires the supplied hot-water heat-consumption prediction value Phot (i) predicted by the supplied hot-water heat-consumption prediction section 230 and the generated-power command pattern Pprof_imag(i)(s1,e1) created by the generated-power command-pattern creation section 212. Then, it calculates a real hot-water storage-tank heat quantity Qnow_real(i) in the case where the fuel-cell power generation apparatus 100 comes to a halt when the hot-water storage tank 106 is filled.

If the hot-water storage tank is filled, in other words, if the hot-water heat quantity stored in the hot-water storage tank reaches a specific heat quantity set in advance, the fuel-cell power generation apparatus 100 comes to a halt. Then, a change is made in the real hot-water storage-tank heat quantity Qnow_real(i). Therefore, the hot-water storage-tank heat-quantity calculation section 215 calculates, as a fullness decision index Qnow_imag(i) for the hot-water storage tank, a transition in the hot-water storage-tank heat quantity which is imagined when it is operated in the generated-power command pattern Pprof_imag(i)(s1,e1). Then, it compares this fullness decision index and the maximum stored hot-water heat quantity of the hot-water storage tank. Thereby, it calculates the real hot-water storage-tank heat quantity Qnow_real(i).

On the basis of a generated-heat quantity Q_gene(i) of the hot-water storage tank, a heat quantity Qnow_real(i−1) of the hot-water storage tank at the time immediately before, the supplied hot-water heat-consumption prediction value Phot(i), the radiated-heat quantity Qloss(i) by which heat is radiated in the hot-water storage tank and the quantity of heat radiated from the piping, the fullness decision index Qnow_imag(i) for the hot-water storage tank is calculated, using the following expression (11).

$$Qnow\_imag(i)=Qnow\_real(i-1)+Qgene(i)-Phot(i)-Qloss(i)-\text{piping radiated-heat quantity} \quad (11)$$

In this expression (11), the piping radiated-heat quantity is a heat loss which, when the heat generated by the fuel-cell power generation apparatus 100 is stored in the hot-water storage tank, can be caused by the heat radiation of its main body. This piping radiated-heat quantity is predetermined through an experiment and is stored beforehand in a storage section embedded in the controller 101.

The hot-water storage-tank heat-quantity calculation section 215 compares the fullness decision index Qnow_imag(i) for the hot-water storage tank and the maximum stored hot-water heat quantity Qmax. Thereby, it decides whether the hot-water storage tank is full or not and calculates the real hot-water storage-tank heat quantity Qnow_real(i). If the hot-water storage tank is not full (Qnow_imag(i)≤Qmax), the hot-water storage-tank heat-quantity calculation section 215 calculates the real hot-water storage-tank heat quantity Qnow_real(i), using the following expression (12).

$$Qnow\_real(i)=Qnow\_imag(i) \quad (12)$$

On the other hand, if the hot-water storage tank is full (Qnow_imag(i)>Qmax), heat is not generated because the fuel-cell power generation apparatus 100 stops operating. Hence, the hot-water storage-tank heat-quantity calculation section 215 calculates the real hot-water storage-tank heat quantity Qnow_real(i), using the following expression (13).

$$Qnow\_real(i)=Qnow\_real(i-1)-Phot(i)-Qloss(i)-\text{piping radiated-heat quantity} \quad (13)$$

In addition, using the fullness decision index Qnow_imag(i) of the hot-water storage tank calculated by the hot-water storage-tank heat-quantity calculating means, the generated-power command-pattern creation section 212 creates a real generated-power command pattern Pprof_real(i)(s1,e1) which is designed so that the fuel-cell power generation apparatus 100 comes to a halt when the hot-water storage tank is filled.

If the fuel-cell power generation apparatus 100 comes to a halt at the preceding time (Pprof_real(i−1)(s1,e1)=0) and if the hot-water storage tank is not full (Qnow_imag(i)≤max×return ratio), the generated-power command-pattern creation section 212 creates the real generated-power command pattern Pprof_real(i)(s1,e1), using the following expression (14). Herein, the return ratio is the ratio of the heat quantity of the hot-water storage tank at the time when the fuel-cell power generation apparatus 100 starts to operate after some heat of the hot-water storage tank is consumed so that its heat quantity is reduced, to the maximum stored hot-water heat quantity Qmax. This return ratio is predetermined through an experiment and is stored in advance in a storage section embedded in the controller 101.

$$Pprof\_real(i)(s1,e1)=Pprof\_imag(i)(s1,e1) \quad (14)$$

Moreover, if the fuel-cell power generation apparatus 100 comes to a halt at the preceding time (Pprof_real(i−1)(s1,e1)=0) and if the hot-water storage tank is full (Qnow_imag(i)>Qmax×return ratio), the generated-power command-pattern creation section 212 creates the real generated-power command pattern Pprof_real(i)(s1,e1), using the following expression (15).

$$Pprof\_real(i)(s1,e1)=0 \quad (15)$$

Furthermore, if the fuel-cell power generation apparatus 100 is in operation at the preceding time (Pprof_real(i−1)(s1,e1)≠0) and if the hot-water storage tank is not full (Qnow_imag(i)≤Qmax), the generated-power command-pattern creation section 212 creates the real generated-power command pattern Pprof_real(i)(s1,e1), using the following expression (16).

$$Pprof\_real(i)(s1,e1)=Pprof\_imag(i)(s1,e1) \quad (16)$$

Still further, the fuel-cell power generation apparatus 100 is in operation at the preceding time (Pprof_real(i−1)(s1,e1)≠0) and if the hot-water storage tank is full (Qnow_imag(i)>Qmax), the generated-power command-pattern creation section 212 creates the real generated-power command pattern Pprof_real(i)(s1,e1), using the following expression (17).

$$Pprof\_real(i)(s1,e1)=0 \quad (17)$$

The fuel-cell system-energy calculation section 214 acquires the real generated-power command pattern Pprof_real(i)(s1,e1) from the generated-power command-pattern creation section 212. Then, it acquires the power-consumption prediction value Pgene(i) from the prediction-value acquisition section 211 and acquires the real hot-water storage-tank heat quantity Qnow_real(i) from the hot-water storage-tank heat-quantity calculation section 215. Thereby, it calculates the fuel-cell system energy Efc(i) which is energy after the fuel-cell power generation apparatus 100 is installed.

First, the fuel-cell system-energy calculation section 214 calculates a gas consumption G_fc_imag(i) [Wh] used in the fuel-cell power generation apparatus 100, using the following expression (18).

$$G\_fc\_imag(i)=Pprof\_real(i)(s1,e1)/FC\text{ power-generation efficiency} \quad (18)$$

In this expression (18), the FC power-generation efficiency is the same as that of the expression (4). Using the real generated-power command pattern Pprof_real(i)(s1,e1) and the FC power-generation efficiency, the quantity of gas supplied to the fuel-cell power generation apparatus 100 can be calculated by Pprof_real(i)(s1,e1)/FC power-generation efficiency.

Next, the fuel-cell system-energy calculation section 214 calculates a backup-gas consumption G_backup_imag(i) [Wh] spent by the backup burner 107, using the following expression (19).

$$G\_backup\_imag(i) = \begin{cases} (Phot(i) - Qnow\_real(i))/ & (Phot(i) - Qnow\_real(i) > 0) \\ \text{hot-water supply-efficiency} & \\ 0 & (Phot(i) - Qnow\_real(i) \leq 0) \end{cases} \quad (19)$$

In this expression (19), the hot-water supply-equipment efficiency is the same as the hot-water supply-equipment efficiency used in the expression (2). When a backup-gas consumption is generated, the real hot-water storage-tank heat quantity (Qnow_real(i) [kWh]) calculated by the hot-water storage-tank heat-quantity calculation section 215 is negative. Hence, only in the case of Phot(i)−Qnow_real(i)>0, a backup-gas consumption is generated. In the case of Phot(i)−Qnow_real(i)≤0, an adequate heat quantity is stored in the hot-water storage tank 106. Therefore, there is no need for a backup-gas consumption, and thus, its value is zero.

Next, the fuel-cell system-energy calculation section 214 calculates a purchased-power amount e_buy_imag(i) which is bought from the commercial power source 105, using the following expression (20).

$$e\_buy\_imag(i) = \begin{cases} (Pgene(i) - Pprof\_real(i)(s1, e1))/\text{electricity} & (Pgene(i) > \\ \text{generation efficiency} & Pprof\_real(i)(s1, e1)) \\ 0 & (Pgene(i) \leq \\ & Pprof\_real(i)(s1, e1)) \end{cases} \quad (20)$$

In this expression (20), the electricity generation efficiency is the same as the electricity generation efficiency used in the expression (2). Herein, the amount of purchased power needs to be calculated which is necessary when the fuel-cell power generation apparatus 100 is operated in the real generated-power command pattern Pprof_real(i)(s1,e1) [kWh]. Hence, the purchased-power amount can be calculated, using the difference between the real generated-power command pattern Pprof_real(i)(s1,e1) [kWh] and the power-consumption prediction value Pgene(i) [kWh]. In the case of Pgene(i)>Pprof_real(i)(s1,e1), the amount of generated power falls short, and thus, the purchase of power is estimated to take place. In contrast, in the case of Pgene(i)≤Pprof_real(i)(s1,e1), the purchase of power is not executed, and thus, the purchased-power amount is zero. The purchased-power amount obtained by the above described calculation is supposed to be calculated in a unit of one hour over a future predetermined period from a predetermined time when a prediction is executed.

Then, based on the gas consumption, the backup-gas consumption and the purchased-power amount calculated in the above described expression (18) to expression (20), the fuel-cell system-energy calculation section 214 calculates the fuel-cell system energy Efc(i) [kWh], using the following expression (21).

$$Efc(i)=G\_fc\_imag(i)+G\_backup\_imag(i)+e\_buy\_imag(i) \quad (21)$$

The fuel-cell system energy Efc(i) [kWh] obtained by the above described calculation is supposed to be calculated in a unit of one hour over a future predetermined period from a predetermined time when a prediction is executed.

The energy-balance calculation section 216 calculates energy Total_loss [kWh] which is lost when the fuel-cell power generation apparatus 100 starts to operate, using the following expression (22). Then, it adds this loss energy Total_loss to the fuel-cell system energy Efc(i), and calculates the energy balance E(s1,e1) [kWh] for a future predetermined period from a predetermined time when a prediction is executed, using the following expression (23).

$$Total\_loss = \text{the number of starts} \times \text{rising-loss energy} \quad (22)$$

In this expression (22), the rising-loss energy [Wh/number of start] is energy necessary when the fuel-cell power generation apparatus 100 is started. This is not supposed to contribute directly to the power to be generated, and thus, it is treated as loss energy.

$$E(s1, e1) = \sum_{i=0}^{23} Efc(i) + \text{Total\_loss} \quad (23)$$

The optimum command-pattern selection section 217 acquires energy balances E(s1,e1) [kWh] which are calculated by the energy-balance calculation section 216 and are as many as the number of the combinations of the start time S1 and the stop time e1. From them, it extracts a start time s1_max and a stop time e1_max which give the maximum energy balance E(s1,e1) [kWh]. Then, it sends it to the fuel-cell power generation apparatus 100. The fuel-cell power generation apparatus 100 accepts the start time s1_max and the stop time e1_max which are sent from the controller 101. When operating between the start time and the stop time, it operates so that the generated power becomes equal to the power consumption. This is a so-called electricity-oriented operation.

Figure 8:
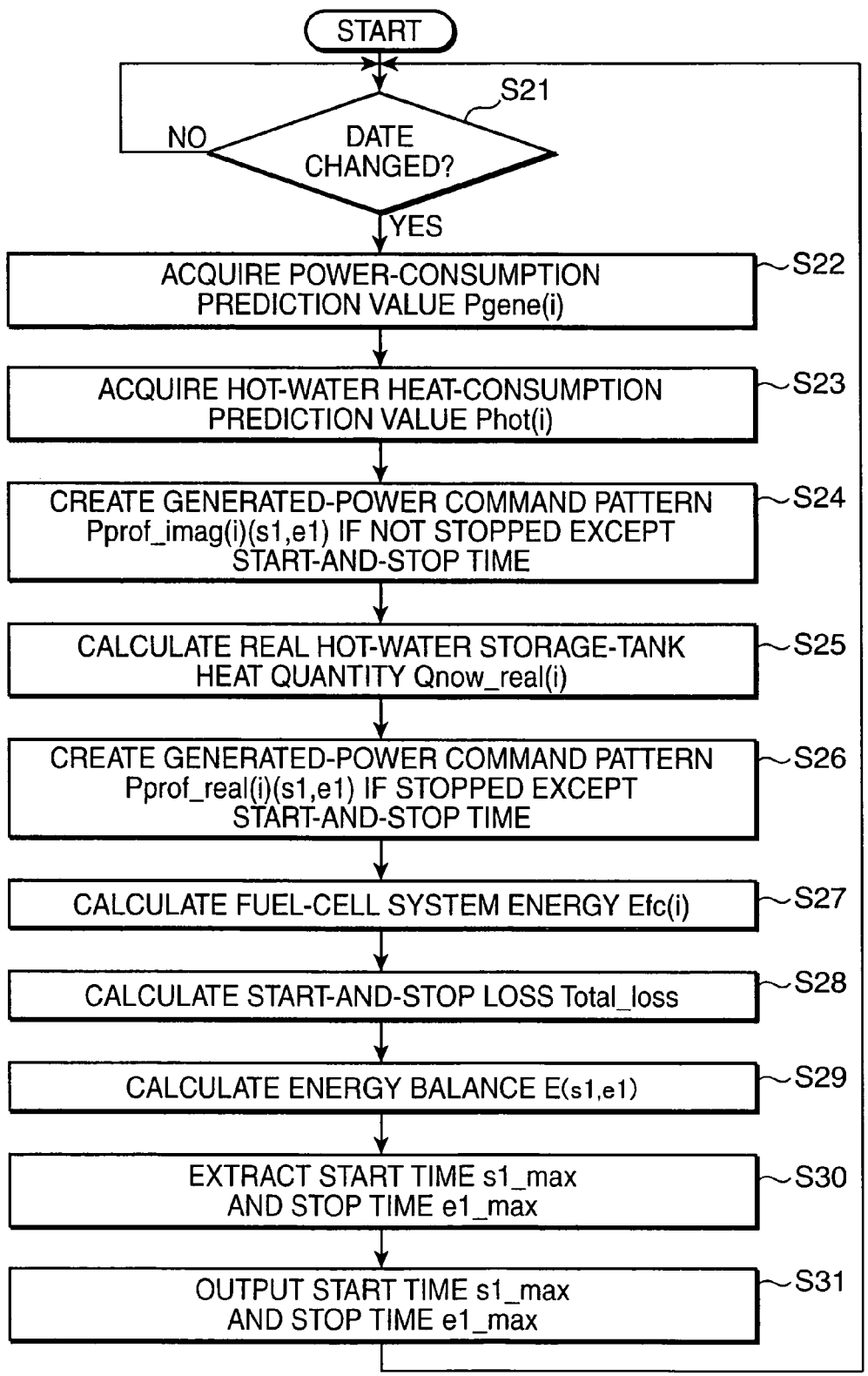
FIG. 8 is a flowchart, showing the operation of the controller according to the second embodiment shown in FIG. 7.

FIG. 8 is a flowchart, showing the operation of the controller 101 according to the second embodiment shown in FIG. 7. Herein, the processing of the steps S21 to S23 shown in FIG. 8 is the same as the processing of the steps S1 to S3 shown in FIG. 6. Thus, its description is omitted.

The generated-power command-pattern creation section 212 acquires the power-consumption prediction value from the power-consumption prediction section 220. Then, it creates a generated-power command pattern Pprof_imag(i)(s1, e1) [kWh] in the case where no stop is made except the start time s1 and the stop time e1 (in a step S24). Herein, s1 is a start time of the fuel-cell power generation apparatus 100 and e1 is a stop time of the fuel-cell power generation apparatus 100. Each of them has a value of 0 to 23. The generated-power command pattern is a combination of the start time s1 and the stop time e1, and thus, 24×24=576 kinds can be created. Incidentally, if the start time is equal to the stop time (or s1=e1), the fuel-cell power generation apparatus 100 keeps operating without coming to a halt. Hence, the generated-power command pattern substantially includes 553 kinds, except for the overlapping ones.

Next, based on the supplied hot-water heat-consumption prediction value Phot(i) and the generated-power command pattern Pprof_imag(i)(s1,e1), the hot-water storage-tank heat-quantity calculation section 215 calculates the real hot-water storage-tank heat quantity Qnow_real(i) [kWh] in the case where the fuel-cell power generation apparatus 100 comes to a halt when the hot-water storage tank is filled (in a step S25).

Specifically, first, the hot-water storage-tank heat-quantity calculation section 215 calculates the generated-heat quantity Q_gene(i) [Wh] of the hot-water storage tank at the time i (i=0-23), using the following expression (24).

$$Q\_gene(i) = Pprof\_imag(i)(s1,e1)/FC \text{ power-generation efficiency} \times FC \text{ hot-water supply-equipment efficiency} \quad (24)$$

As shown in this expression (24), the hot-water storage-tank heat-quantity calculation section 215 divides the FC power-generation efficiency into the generated-power command pattern Pprof_imag(i)(s1,e1) created by the generated-power command-pattern creation section 212. Then, it calculates the generated-heat quantity Q_gene (i) by multiplying the value obtained by this division and the FC hot-water supply-equipment efficiency together.

Sequentially, the hot-water storage-tank heat-quantity calculation section 215 calculates the radiated-heat quantity Qloss(i) [kWh] of the hot-water storage tank at the time i (i=0-23), using the following expression (25).

$$Qloss(i) = Qnow\_real(i-1) \times \text{hot-water storage-tank radiation coefficient} \quad (25)$$

In this expression (25), the hot-water storage-tank radiation coefficient is the same as the hot-water storage-tank radiation coefficient of the expression (3). As shown in the expression (25), the hot-water storage-tank heat-quantity calculation section 215 calculates the radiated-heat quantity Qloss(i) of the hot-water storage tank by multiplying the real hot-water storage-tank heat quantity Qnow_real(i−1) at the preceding time and the hot-water storage-tank radiation coefficient together.

Next, the hot-water storage-tank heat-quantity calculation section 215 calculates, as the fullness decision index Qnow_imag(i) for the hot-water storage tank, the hot-water storage-tank heat quantity Qnow_real(i) which is imagined when an operation is executed in the generated-power command pattern Pprof_imag(i)(s1,e1). Specifically, as shown in the above described expression (11), the hot-water storage-tank heat-quantity calculation section 215 adds a power-generation hot-water supply load Qgene(i) to the real hot-water storage-tank heat quantity Qnow_real(i−1) at the preceding time. Then, it calculates the fullness decision index Qnow_imag(i) of the hot-water storage tank by subtracting, from the value obtained by this addition, the supplied hot-water heat-consumption prediction value Phot (i), the radiated-heat quantity Qloss (i) and the piping radiated-heat quantity.

Sequentially, if the hot-water storage tank is not full (Qnow_imag(i)≤Qmax), the hot-water storage-tank heat-quantity calculation section 215 considers the fullness decision index Qnow_imag(i) of the hot-water storage tank to be the real hot-water storage-tank heat quantity Qnow_real(i). In contrast, if the hot-water storage tank is full (Qnow_imag(i)> Qmax), the hot-water storage-tank heat-quantity calculation section 215 subtracts the supplied hot-water heat-consumption prediction value Phot(i), the radiated-heat quantity Qloss (i) and the piping radiated-heat quantity from the real hot-water storage-tank heat quantity Qnow_real(i−1) at the preceding time. Thereby, it calculates the real hot-water storage-tank heat quantity Qnow_real(i).

Next, the generated-power command-pattern creation section 212 creates the generated-power command pattern Pprof_real(i)(s1,e1) [kWh] in the case where a stop is made at a time excluding the start time s1 and the stop time e1 (in a step S26).

Herein, if the fuel-cell power generation apparatus 100 comes to a halt at the preceding time (Pprof_real(i−1)(s1,e1)= 0) and if the hot-water storage tank is not full (Qnow_imag(i)≤=Qmax×return ratio), the generated-power command-pattern creation section 212 sets the generated-power command pattern Pprof_imag(i)(s1,e1) in the case where no stop is made except for the start time and the stop time, to the real generated-power command pattern Pprof_real(i)(s1,e1).

Moreover, if the fuel-cell power generation apparatus 100 comes to a halt at the preceding time (Pprof_real(i−1)(s1,e1)= 0) and if the hot-water storage tank is full (Qnow_imag(i)>Qmax×return ratio), the generated-power command-pattern creation section 212 sets the real generated-power command pattern Pprof_real(i)(s1,e1) to zero.

Furthermore, if the fuel-cell power generation apparatus 100 is in operation at the preceding time (Pprof_real(i−1)(s1, e1) ≠0) and if the hot-water storage tank is not full (Qnow_imag(i)≤Qmax), the generated-power command-pattern creation section 212 sets the generated-power command pattern Pprof_imag(i)(s1,e1) in the case where no stop is made except for the start time and the stop time, to the real generated-power command pattern Pprof_real(i)(s1,e1).

Still further, the fuel-cell power generation apparatus 100 is in operation at the preceding time (Pprof_real(i−1)(s1,e1) ≠ 0) and if the hot-water storage tank is full (Qnow_imag(i)>Qmax), the generated-power command-pattern creation section 212 sets the real generated-power command pattern Pprof_real (i)(s1,e1) to zero.

Next, based on the real generated-power command pattern Pprof_real(i)(s1,e1), the power-consumption prediction value Pgene(i) and the real hot-water storage-tank heat quantity Qnow_real(i), the fuel-cell system-energy calculation section 214 calculates the fuel-cell system energy Efc(i) which is energy after the fuel-cell power generation apparatus 100 is installed (in a step S27).

Specifically, the fuel-cell system-energy calculation section 214 calculates the gas consumption G_fc_imag(i) used in the fuel-cell power generation apparatus 100, using the above described expression (18). Next, the fuel-cell system-energy calculation section 214 calculates the backup-gas consumption G_backup_imag(i) spent by the backup burner 107, using the above described expression (19). Sequentially, the fuel-cell system-energy calculation section 214 calculates a purchased-power amount e_buy_imag(i) which is bought from the commercial power source 105, using the above described expression (20).

Next, based on the gas consumption, the backup-gas consumption and the purchased-power amount, the fuel-cell system-energy calculation section 214 calculates the fuel-cell system energy Efc(i), using the above described expression (21).

Sequentially, the energy-balance calculation section 216 calculates the energy Total_loss which is lost when the fuel-cell power generation apparatus 100 starts to operate, using the above described expression (22) (in a step S28). Next, the energy-balance calculation section 216 calculates the energy balance E(s1,e1) by adding the value obtained by adding this loss energy Total_loss at the start time to the fuel-cell system energy Efc(i). Incidentally, the processing of the steps S30 and S31 in FIG. 8 is the same as the processing of the steps S10 and S11 in FIG. 6. Thus, its description is omitted.

In this way, if the stored hot-water heat quantity of the hot-water storage tank 106 reaches a predetermined value, the fuel-cell power generation apparatus 100 comes to a halt.

Then, a real generated-power command pattern is created which is realized when a stop is made at a time other than the stop time of a generated-power command pattern. Next, a real hot-water storage-tank heat quantity of the hot-water storage tank is calculated which is obtained when a radiated-heat quantity is subtracted from a supplied hot-water heat-consumption prediction value. On the basis of a plurality of such real generated-power command patterns, the real hot-water storage-tank heat quantity and a power-consumption prediction value, if the fuel-cell power generation apparatus 100 is operated in each generated-power command pattern, fuel-cell system energy is calculated which indicates the energy equivalent to the quantity of gas required in the hot-water supply equipment 108 and the electricity required in the electric equipment 104.

Therefore, except for the stop time of the generated-power command pattern, if the heat quantity of hot water stored in the hot-water storage tank reaches a predetermined value, the fuel-cell power generation apparatus 100 comes to a halt. Taking this case into account, the fuel-cell system energy can be calculated, thus helping determine the generated-power command pattern more precisely.

Third Embodiment

Next, a third embodiment of the present invention will be described. In the second embodiment, if the hot-water storage tank is filled, the fuel-cell power generation apparatus 100 is stopped. In contrast, in the third embodiment, the fuel-cell power generation system 120 further includes a radiator which radiates heat from the hot-water storage tank. Even if the hot-water storage tank fills, then without stopping, the fuel-cell power generation apparatus 100 keeps operating while radiating some heat of the hot-water storage tank.

Figure 9:
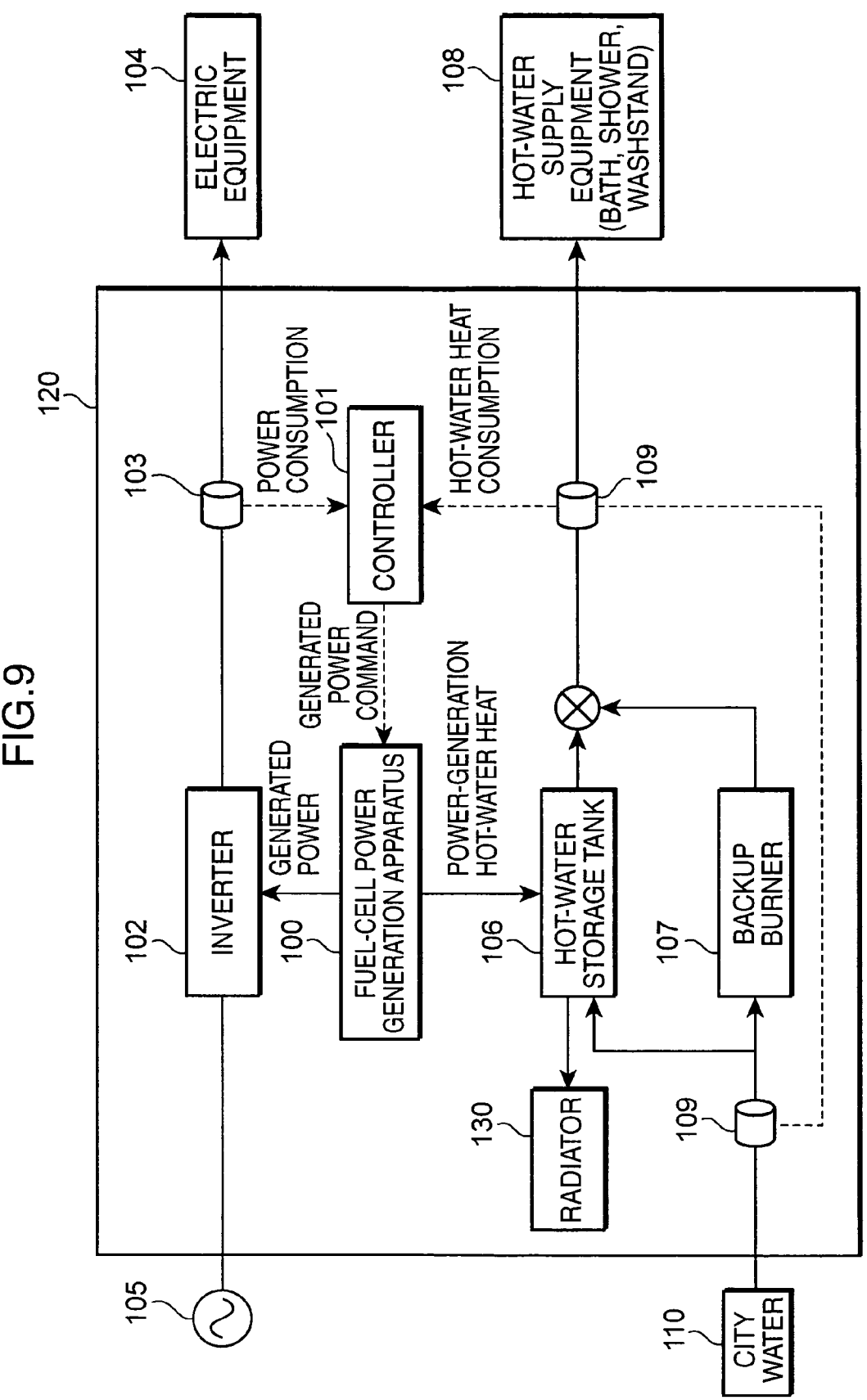
FIG. 9 is a block diagram, showing the whole configuration of a fuel-cell power generation system according to a third embodiment of the present invention.

FIG. 9 is a block diagram, showing the whole configuration of a fuel-cell power generation system according to the third embodiment of the present invention. A fuel-cell power generation system 120 shown in FIG. 9 is configured by a fuel-cell power generation apparatus 100, a controller 101, an inverter 102, a wattmeter 103, a hot-water storage tank 106, a backup burner 107, a supplied hot-water calorimeter 109, and a radiator 130. In FIG. 9, several component elements have the same configuration as those of the fuel-cell power generation system according to the first embodiment shown in FIG. 1, and thus, their description is omitted.

If the quantity of heat in the hot-water storage tank 106 reaches a predetermined value, the radiator 130 radiates heat from the hot-water storage tank 106. Thereby, it always keeps the heat quantity of the hot-water storage tank 106 at a fixed value.

Figure 10:
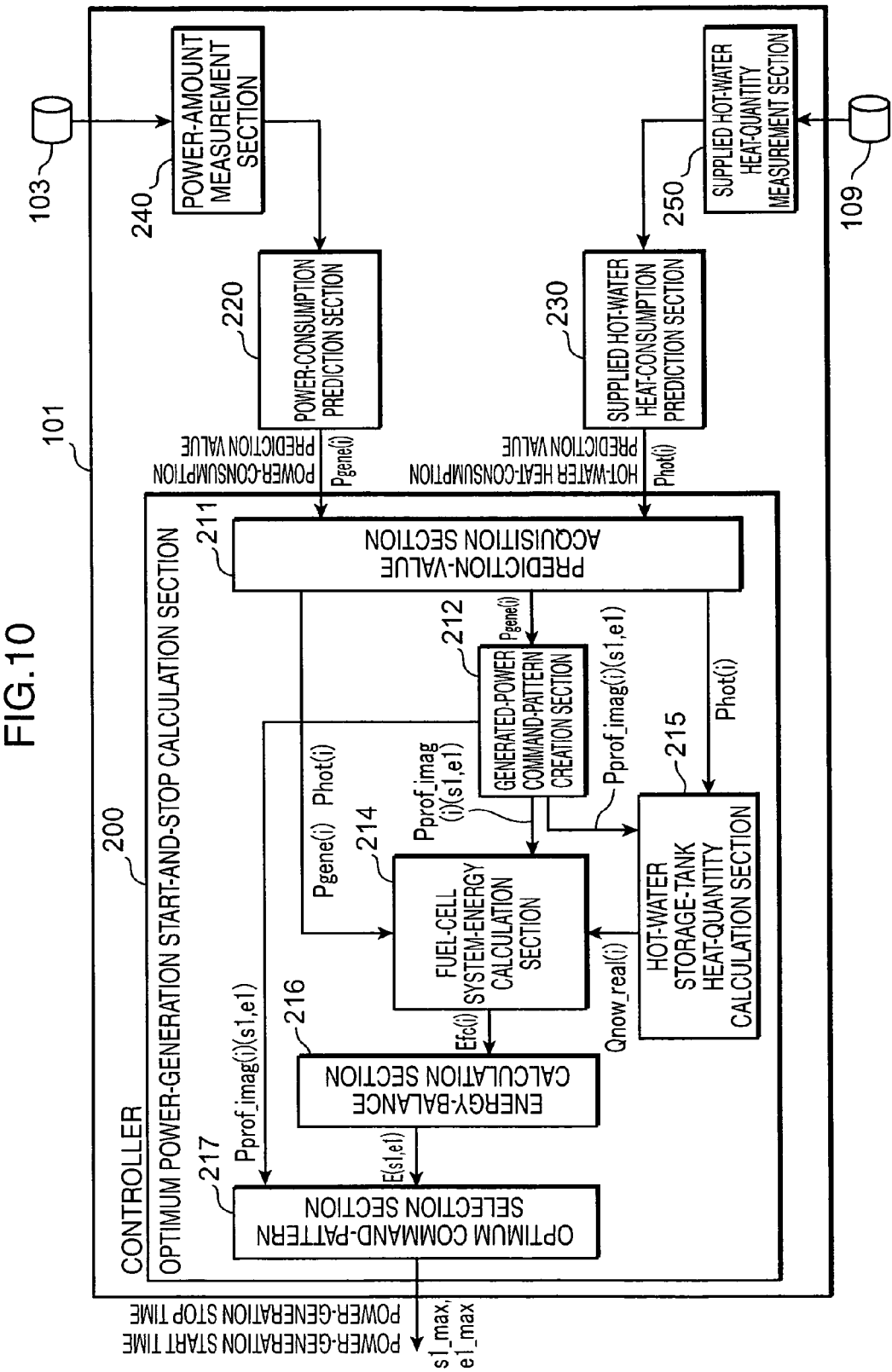
FIG. 10 is a block diagram, showing the configuration of a controller according to the third embodiment.

Next, the configuration of the controller 101 according to the third embodiment will be described. FIG. 10 is a block diagram, showing the configuration of the controller 101 according to the third embodiment. In FIG. 10, several component elements have the same configuration as those of the controller according to the second embodiment shown in FIG. 7, and thus, their description is omitted.

The fuel-cell system-energy calculation section 214 calculates a power-loss energy Radietor_loss (i) [Wh] by the radiator 130, using the following expression (26).

$$\text{Radietor\_loss} = \begin{cases} 0 & (\text{Qnow\_imag} \leq Q\text{max}) \\ \text{radiator's radiation-time power consumption} \times \text{one hour} / \text{electricity generation efficiency} & (\text{Qnow\_imag} > Q\text{max}) \end{cases} \quad (26)$$

As shown in this expression (26), if the hot-water storage tank is not full (Qnow_imag(i)≤Qmax), the fuel-cell system-energy calculation section 214 sets the power-loss energy Radietor_loss(i) by the radiator 130 to zero. On the other hand, if the hot-water storage tank is full (Qnow_imag(i) >Qmax), the fuel-cell system-energy calculation section 214 multiplies the power [W] used at a radiation time by the radiator 130 and 1 [h] together. Then, it divides the electricity generation efficiency into the value obtained by this multiplication, thereby obtaining the power-loss energy Radietor_loss(i) by the radiator 130.

Incidentally, the power [W] used at a radiation time by the radiator 130 is predetermined through an experiment or the like and is stored beforehand in a storage section provided in the controller 101.

The fuel-cell system-energy calculation section 214 calculates the gas consumption G_fc_imag(i) [Wh] used in the fuel-cell power generation apparatus 100 and the backup-gas consumption G_backup_imag(i) [Wh] spent by the backup burner 107. The gas consumption G_fc_imag(i) is calculated using the following expression (27).

$$G\_fc\_\text{imag}(i) = P\text{prof\_imag}(i)(s1,e1)/FC \text{ power-generation efficiency} \quad (27)$$

In this expression (27), the FC power-generation efficiency is the same as that of the expression (4). Using the generated-power command pattern Pprof_imag(i)(s1,e1) in the case where no stop is made except the start time s1 and the stop time e1 and the FC power-generation efficiency, the quantity of gas supplied to the fuel-cell power generation apparatus 100 can be calculated by Pprof_imag(i)(s1,e1)/FC power-generation efficiency.

In addition, the backup-gas consumption G_backup_imag (i) is calculated using the above described expression (19). The fuel-cell system-energy calculation section 214 calculates a purchased-power amount e_buy_imag(i) which is bought from the commercial power source 105, using the following expression (28).

$$e\_buy\_\text{image}(i) = \begin{cases} (P\text{gene}(i) - P\text{prof\_imag}(i)(s1,\ e1))/ & (P\text{gene}(i) > \\ \text{electricity generation efficiency} & P\text{prof\_imag}(i)(s1,\ e1)) \\ 0 & (P\text{gene}(i) \leq \\ & P\text{prof\_imag}(i)(s1,\ e1)) \end{cases} \quad (28)$$

In this expression (28), the electricity generation efficiency is the same as the electricity generation efficiency used in the expression (2). Herein, the purchased-power amount e_buy_imag(i) can be calculated, using the difference between the real generated-power command pattern Pprof_imag(i)(s1,e1) [kWh] and the power-consumption prediction value Pgene(i) [kWh]. In the case of Pgene(i)>Pprof_imag(i)(s1,e1), the amount of generated power falls short, and thus, the purchase of power is estimated to take place. In contrast, in the case of Pgene(i)≤Pprof_imag(i)(s1,e1), the purchase of power is not executed, and thus, the purchased-power amount is zero. The purchased-power amount obtained by the above described calculation is supposed to be calculated in a unit of one hour over a future predetermined period from a predetermined time when a prediction is executed.

Based on the gas consumption, the backup-gas consumption, the purchased-power amount and the power-loss energy, the fuel-cell system-energy calculation section 214 calculates the fuel-cell system energy Efc(i) [kWh], using the following expression (29).

$$Efc(i)=G\_fc\_imag(i)+G\_backup\_imag(i)+e\_buy\_imag(i)+Radietor\_loss(i) \quad (29)$$

Figure 11:
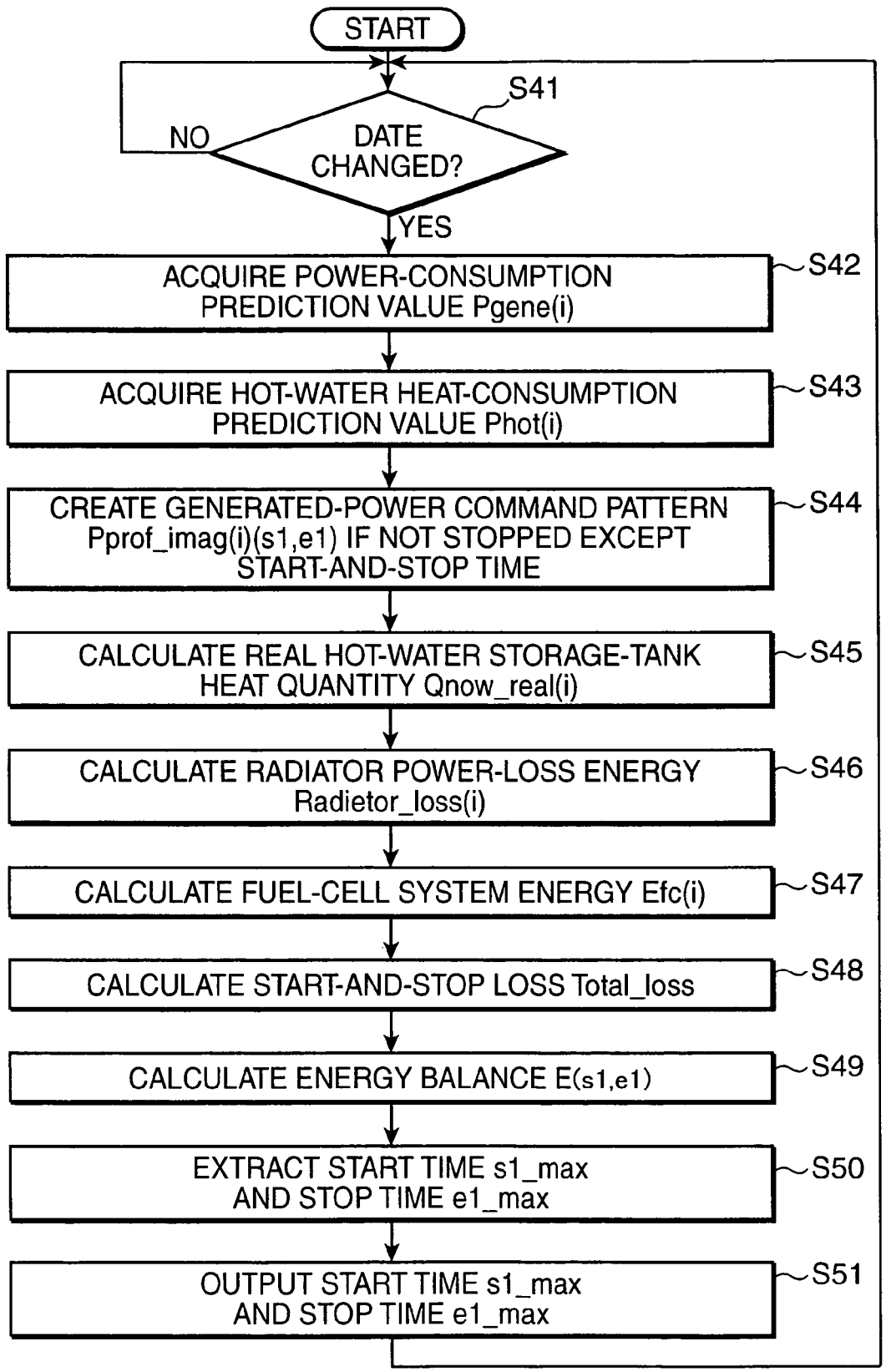
FIG. 11 is a flowchart, showing the operation of the controller according to the third embodiment.

FIG. 11 is a flowchart, showing the operation of the controller 101 according to the third embodiment. Herein, the processing of the steps S41 to S45 shown in FIG. 11 is the same as the processing of the steps S21 to S25 shown in FIG. 8. Thus, its description is omitted.

The fuel-cell system-energy calculation section 214 calculates the power-loss energy Radietor_loss(i) [Wh] by the radiator 130, using the above described expression (26) (in a step S46).

Next, based on the gas consumption, the backup-gas consumption, the purchased-power amount and the power-loss energy which are calculated using the above described expression (28), expression (19), expression (27) and expression (26), the fuel-cell system-energy calculation section 214 calculates the fuel-cell system energy Efc(i) [kWh], using the above described expression (29) (in a step S47). Incidentally, the processing of the steps S48 to S51 in FIG. 11 is the same as the processing of the steps S28 to S31 in FIG. 8. Thus, its description is omitted.

In this way, a real hot-water storage-tank heat quantity of the hot-water storage tank 106 is calculated which is obtained when a radiated-heat quantity is subtracted from a supplied hot-water heat-consumption prediction value. If the stored hot-water heat quantity of the hot-water storage tank 106 is equal to, or above, a predetermined value, then a power loss is calculated which is caused by the heat radiation of the radiator 130. On the basis of a plurality of such generated-power command patterns, the real hot-water storage-tank heat quantity, the power-consumption prediction value and the power loss, if the fuel-cell power generation apparatus 100 is operated in each generated-power command pattern, fuel-cell system energy is calculated which indicates the energy equivalent to the quantity of gas required in the hot-water supply equipment 108 and the electricity required in the electric equipment 104.

Therefore, when the hot-water storage tank is filled, in the case where the fuel-cell power generation apparatus 100 keeps operating without stopping while radiating heat using a radiator, the fuel-cell system energy can be calculated, evaluating a power loss caused by operating the radiator. This helps determine the generated-power command pattern more accurately.

Fourth Embodiment

Next, a fourth embodiment of the present invention will be described. In the first to third embodiments, an instruction for a start time and a stop time is given to the fuel-cell power generation apparatus 100. In contrast, in the fourth embodiment, a switchover is made from the control mode of starting and stopping the fuel-cell power generation apparatus 100 to the control mode of operating the fuel-cell power generation apparatus 100 continuously without stopping it.

FIG. 12 is a block diagram, showing the configuration of a controller 101 according to the fourth embodiment. In FIG. 12, several component elements have the same configuration as those of the controller according to the first embodiment shown in FIG. 2, and thus, their description is omitted. Besides, the whole configuration of a fuel-cell power generation system according to the fourth embodiment is the same as that of FIG. 1.

The controller 101 includes an optimum power-generation start-and-stop calculation section 200, a power-consumption prediction section 220, a supplied hot-water heat-consumption prediction section 230, a power-amount measurement section 240, a supplied hot-water heat-quantity measurement section 250, a switch section 270, and a generated-power adjustment section 400.

The switch section 270 switches from the start-and-stop control mode of starting and stopping the fuel-cell power generation apparatus 100 to the continuous-operation control mode of operating the fuel-cell power generation apparatus 100 continuously without stopping it. The switch section 270 has a calendar function, and thus, if it decides that the winter season when the quantity of supplied hot water increases has arrived, it switches the control mode to the continuous-operation control mode. On the other hand, if it decides that the current season is not wintertime, it switches the control mode to the start-and-stop control mode. Incidentally, the winter season is a period, for example, from December until February.

If the switch section 270 switches the control mode to the continuous-operation control mode, then it outputs, to the generated-power adjustment section 400, a power-consumption prediction value predicted by the power-consumption prediction section 220 and a supplied hot-water heat-consumption prediction value predicted by the supplied hot-water heat-consumption prediction section 230. In contrast, if the switch section 270 switches the control mode to the start-and-stop control mode, then it outputs, to the optimum power-generation start-and-stop calculation section 200, the power-consumption prediction value predicted by the power-consumption prediction section 220 and the supplied hot-water heat-consumption prediction value predicted by the supplied hot-water heat-consumption prediction section 230.

Based upon the power-consumption prediction value predicted by the power-consumption prediction section 220 and the supplied hot-water heat-consumption prediction value predicted by the supplied hot-water heat-consumption prediction section 230, the generated-power adjustment section 400 predicts an accumulative stored hot-water heat quantity which is accumulated from the current stored hot-water heat quantity. Then, it adjusts the generated power so that this accumulative stored hot-water heat quantity does not exceed a predetermined maximum stored hot-water heat quantity.

The generated-power adjustment section 400 includes a prediction-value acquisition section 401, a power-generation command-value setting section 402, a power-generation hot-water supply load calculation section 403, a predicted accumulative stored hot-water heat-quantity calculation section 404, a stored hot-water heat-quantity acquisition section 405, and a generated-power command-value modification section 406.

The prediction-value acquisition section 401 acquires the power-consumption prediction value Pgene(i) [kWh] which is predicted by the power-consumption prediction section 220 and a supplied hot-water heat-consumption prediction value Phot(i) [kWh] which is predicted by the supplied hot-water heat-consumption prediction section 230.

The power-generation command-value setting section 402 sets the power-consumption prediction value Pgene(i) [kWh] as the initial value of a generated-power command value Pprof(i) [kWh]. This corresponds to the case where a electricity-oriented operation is fully executed until twenty-four hours ahead.

If the fuel-cell power generation apparatus 100 generates electric power based on the generated-power command value Pprof(i) [kWh], the quantity of heat is additionally generated. The power-generation hot-water supply load calculation section 403 calculates the power-generation hot-water supply load Qgene(i) [kWh] which is this additionally-generated heat quantity. The power-generation hot-water supply load Qgene(i) is calculated, using the following expression (30).

$$Qgene(i)[kWh] = Pprof(i)[kWh] \times (\text{hot-water supply efficiency}[\%] / \text{power-generation efficiency}[\%]) \quad (30)$$

On the basis of the power-generation hot-water supply load Qgene(i) and the supplied hot-water heat-consumption prediction value Phot(i), the predicted accumulative stored hot-water heat-quantity calculation section 404 calculates a predicted accumulative stored hot-water heat quantity Qadd(i) [kWh] which is a heat quantity added to, or reduced from, the hot-water storage tank until twenty-four hours ahead predictable from the present time, using the following expression (31).

$$Qadd(i) = Qgene(i) - Phot(i) + Qadd(i-1) \quad (31)$$

The stored hot-water heat-quantity acquisition section 405 acquires, from the hot-water storage tank 106, the current stored hot-water heat quantity Qnow [kWh] of the hot-water storage tank 106. In an ordinary method of calculating the current stored hot-water heat quantity Qnow, a temperature sensor or the like is attached to the hot-water storage tank 106. Thereby, it can be obtained by measuring the temperature distribution of hot water which remains in the tank.

The generated-power command-value modification section 406 calculates a time i at which the predicted accumulative stored hot-water heat quantity Qadd(i) exceeds the storable hot-water heat quantity (Qmax−Qnow). Herein, Qmax [kWh] is the maximum stored hot-water heat quantity, and it is a fixed value which depends upon the size of the hot-water storage tank 106. The fact that the predicted accumulative stored hot-water heat quantity Qadd(i) exceeds the storable hot-water heat quantity (Qmax−Qnow) means that the hot-water storage tank 106 is filled at this time i. In other words, the generated-power command-value modification section 406 decides whether or not the predicted accumulative stored hot-water heat quantity Qadd(i) is greater than the value (i.e., the storable hot-water heat quantity) left after the current stored hot-water heat quantity Qnow is subtracted from the maximum stored hot-water heat quantity Qmax.

If the predicted accumulative stored hot-water heat quantity Qadd(i) is greater than the storable hot-water heat quantity (Qmax−Qnow), the generated-power command-value modification section 406 modifies the generated-power command value Pprof(i), using the following expression (32).

$$Pprof(i) = Pprof(i) - \Delta Pprof \quad (32)$$

In this expression (32), ΔPprof is a change unit for modifying the generated-power command value Pprof(i) [kWh]. In general, a value (i.e., the fixed value) which is small enough is set in advance.

Through such a series of operations as described above, the generated-power command value Pprof(i) [kWh] is modified so that the hot-water storage tank 106 will not be filled. Ultimately, it is sent to the fuel-cell power generation apparatus 100. The fuel-cell power generation apparatus 100 generates electric power so that it coincides with the generated-power command value Pprof(i) [kWh] outputted from the generated-power command-value modification section 406.

Incidentally, in this embodiment, the prediction-value acquisition section 211 corresponds to an example of the prediction-value acquiring means; the generated-power adjustment section 400, to an example of the generated-power adjusting means; and the switch section 270, to an example of the switching means.

In this way, a power-consumption prediction value is acquired by the prediction-value acquisition section 211. The acquired power-consumption prediction value is outputted to the generated-power command-pattern creation section 212 and the fuel-cell system-energy calculation section 214. Simultaneously, a supplied hot-water heat-consumption prediction value is acquired, and the acquired supplied hot-water heat-consumption prediction value is outputted to the hot-water storage-tank heat-quantity calculation section 215. In addition, by the generated-power adjustment section 400, based on the power-consumption prediction value and the supplied hot-water heat-consumption prediction value, an accumulative stored hot-water heat quantity is predicted which is accumulated from the current stored hot-water heat quantity. Then, the generated power is adjusted so that the predicted accumulative stored hot-water heat quantity does not exceed a predetermined maximum stored hot-water heat quantity. Sequentially, by the switch section 270, the power-consumption prediction value and the supplied hot-water heat-consumption prediction value are outputted to either of the prediction-value acquisition section 211 and the generated-power adjustment section 400.

Therefore, if the power-consumption prediction value and the supplied hot-water heat-consumption prediction value are outputted to the generated-power adjustment section 400, the generated power of the fuel-cell power generation apparatus 100 is adjusted, based on the power-consumption prediction value and the supplied hot-water heat-consumption prediction value. Thereby, a power consumption and a supplied hot-water heat consumption different in each home are predicted, so that the generated power of the fuel-cell power generation apparatus 100 can be efficiently controlled. As a result, the fuel-cell power generation apparatus 100 can be continuously operated without being stopped.

Incidentally, in this embodiment, the operation is set to the continuous-operation control mode in winter, while it is set to the start-and-stop control mode in the other seasons. However, the present invention is not limited especially to this. For example, the switch section 270 totals up, separately in each month, supplied hot-water heat quantities which are measured by the supplied hot-water heat-quantity measurement section 250. Then, it may also set, to the continuous-operation control mode, the operation for each month whose supplied hot-water heat quantity is larger than a predetermined value, while it can set the operation for the other months to the start-and-stop control mode. Besides, the control mode may also be changed not only every month, but also weekly or daily.

Summary of the Embodiments

A control unit for a fuel-cell power generation apparatus according to the present invention which generates electric power and heat using a fuel, supplies the electric power to electric equipment, and also uses the heat to supply hot water to hot-water supply equipment, comprising: a power-amount measuring means for measuring a power consumption consumed by the electric equipment; a power-consumption predicting means for predicting a future power consumption for a predetermined period from a predetermined time, based on the power consumption measured by the power-amount measuring means; a supplied hot-water heat-quantity measuring means for measuring a supplied hot-water heat consumption consumed by the hot-water supply equipment; a supplied hot-water heat-consumption predicting means for predicting a future supplied hot-water heat consumption for a predetermined period from a predetermined time, based on the supplied hot-water heat consumption measured by the supplied hot-water heat-quantity measuring means; a generated-power command-pattern creating means for, based on a power-consumption prediction value predicted by the power-consumption predicting means, creating a plurality of generated-power command patterns which are obtained from a combination of a start time and a stop time of the fuel-cell power generation apparatus; a hot-water storage-tank heat-quantity calculating means for, based on a supplied hot-water heat-consumption prediction value predicted by the supplied hot-water heat-consumption predicting means, calculating a stored hot-water heat quantity for the predetermined period in a hot-water storage tank which stores warmed water using the heat generated simultaneously with the power generation and supplies the warmed water to the hot-water supply equipment; a fuel-cell system-energy calculating means for, based on the plurality of generated-power command patterns created by the generated-power command-pattern creating means, the stored hot-water heat quantity calculated by the hot-water storage-tank heat-quantity calculating means and the power-consumption prediction value predicted by the power-consumption predicting means, if the fuel-cell power generation apparatus is operated in each generated-power command pattern, calculating fuel-cell system energy which indicates the energy of the fuel required in the hot-water supply equipment and electricity required in the electric equipment; and a fuel-cell operating means for, in terms of the fuel-cell system energy in each of the plurality of generated-power command patterns which is calculated by the fuel-cell system-energy calculating means, operating the fuel-cell power generation apparatus in the generated-power command pattern which minimizes the fuel-cell system energy.

A control method for a fuel-cell power generation apparatus according to the present invention in which electric power supplied to electric equipment is generated using a fuel, and using simultaneously generated heat, hot water is supplied to hot-water supply equipment, including: a power measuring step of measuring a power consumption consumed by the electric equipment; a power-consumption predicting step of predicting a future power consumption for a predetermined period from a predetermined time, based on the power consumption measured in the power measuring step; a supplied hot-water heat-quantity measuring step of measuring a supplied hot-water heat consumption consumed by the hot-water supply equipment; a supplied hot-water heat-consumption predicting step of predicting a future supplied hot-water heat consumption for a predetermined period from a predetermined time, based on the supplied hot-water heat consumption measured in the supplied hot-water heat-quantity measuring step; a generated-power command-pattern creating step of, based on a power-consumption prediction value predicted in the power-consumption predicting step, creating a plurality of generated-power command patterns which are obtained from a combination of a start time and a stop time of the fuel-cell power generation apparatus; a hot-water storage-tank heat-quantity calculating step of, based on a supplied hot-water heat-consumption prediction value predicted in the supplied hot-water heat-consumption predicting step, calculating a stored hot-water heat quantity for the predetermined period in a hot-water storage tank which stores warmed water using the heat generated simultaneously with the power generation and supplies the warmed water to the hot-water supply equipment; a fuel-cell system-energy calculating step of, based on the plurality of generated-power command patterns created in the generated-power command-pattern creating step, the stored hot-water heat quantity calculated in the hot-water storage-tank heat-quantity calculating step and the power-consumption prediction value predicted in the power-consumption predicting step, if the fuel-cell power generation apparatus is operated in each generated-power command pattern, calculating fuel-cell system energy which indicates the energy of the fuel required in the hot-water supply equipment and electricity required in the electric equipment; and a fuel-cell operating step of, in terms of the fuel-cell system energy in each of the plurality of generated-power command patterns which is calculated in the fuel-cell system-energy calculating step, operating the fuel-cell power generation apparatus in the generated-power command pattern which minimizes the fuel-cell system energy.

A control program for a fuel-cell power generation apparatus according to the present invention by which electric power supplied to electric equipment is generated using a fuel, and using simultaneously generated heat, hot water is supplied to hot-water supply equipment, allowing a computer to function as: a power-amount measuring means for measuring a power consumption consumed by the electric equipment; a power-consumption predicting means for predicting a future power consumption for a predetermined period from a predetermined time, based on the power consumption measured by the power-amount measuring means; a supplied hot-water heat-quantity measuring means for measuring a supplied hot-water heat consumption consumed by the hot-water supply equipment; a supplied hot-water heat-consumption predicting means for predicting a future supplied hot-water heat consumption for a predetermined period from a predetermined time, based on the supplied hot-water heat consumption measured by the supplied hot-water heat-quantity measuring means; a generated-power command-pattern creating means for, based on a power-consumption prediction value predicted by the power-consumption predicting means, creating a plurality of generated-power command patterns which are obtained from a combination of a start time and a stop time of the fuel-cell power generation apparatus; a hot-water storage-tank heat-quantity calculating means for, based on a supplied hot-water heat-consumption prediction value predicted by the supplied hot-water heat-consumption predicting means, calculating a stored hot-water heat quantity for the predetermined period in a hot-water storage tank which stores warmed water using the heat generated simultaneously with the power generation and supplies the warmed water to the hot-water supply equipment; a fuel-cell system-energy calculating means for, based on the plurality of generated-power command patterns created by the generated-power command-pattern creating means, the stored hot-water heat quantity calculated by the hot-water storage-tank heat-quantity calculating means and the power-consumption prediction value predicted by the power-consumption predicting means, if the fuel-cell power generation apparatus is operated in each generated-power command pattern, calculating fuel-cell system energy which indicates the energy of the fuel required in the hot-water supply equipment and electricity required in the electric equipment; and a fuel-cell operating means for, in terms of the fuel-cell system energy in each of the plurality of generated-power command patterns which is calculated by the fuel-cell system-energy calculating means, operating the fuel-cell power generation apparatus in the generated-power command pattern which minimizes the fuel-cell system energy.

A computer-readable record medium with a control program for a fuel-cell power generation apparatus on record according to the present invention by which electric power supplied to electric equipment is generated using a fuel, and using simultaneously generated heat, hot water is supplied to hot-water supply equipment, allowing a computer to function as: a power-amount measuring means for measuring a power consumption consumed by the electric equipment; a power-consumption predicting means for predicting a future power consumption for a predetermined period from a predetermined time, based on the power consumption measured by the power-amount measuring means; a supplied hot-water heat-quantity measuring means for measuring a supplied hot-water heat consumption consumed by the hot-water supply equipment; a supplied hot-water heat-consumption predicting means for predicting a future supplied hot-water heat consumption for a predetermined period from a predetermined time, based on the supplied hot-water heat consumption measured by the supplied hot-water heat-quantity measuring means; a generated-power command-pattern creating means for, based on a power-consumption prediction value predicted by the power-consumption predicting means, creating a plurality of generated-power command patterns which are obtained from a combination of a start time and a stop time of the fuel-cell power generation apparatus; a hot-water storage-tank heat-quantity calculating means for, based on a supplied hot-water heat-consumption prediction value predicted by the supplied hot-water heat-consumption predicting means, calculating a stored hot-water heat quantity for the predetermined period in a hot-water storage tank which stores warmed water using the heat generated simultaneously with the power generation and supplies the warmed water to the hot-water supply equipment; a fuel-cell system-energy calculating means for, based on the plurality of generated-power command patterns created by the generated-power command-pattern creating means, the stored hot-water heat quantity calculated by the hot-water storage-tank heat-quantity calculating means and the power-consumption prediction value predicted by the power-consumption predicting means, if the fuel-cell power generation apparatus is operated in each generated-power command pattern, calculating fuel-cell system energy which indicates the energy of the fuel required in the hot-water supply equipment and electricity required in the electric equipment; and a fuel-cell operating means for, in terms of the fuel-cell system energy in each of the plurality of generated-power command patterns which is calculated by the fuel-cell system-energy calculating means, operating the fuel-cell power generation apparatus in the generated-power command pattern which minimizes the fuel-cell system energy.

According to these configurations, a power consumption consumed by the electric equipment is measured, and based on the measured power consumption, a future power consumption for a predetermined period from a predetermined time is predicted. Then, a supplied hot-water heat consumption consumed by the hot-water supply equipment is measured, and based on the measured supplied hot-water heat consumption, a future supplied hot-water heat consumption for a predetermined period from a predetermined time is predicted. Based on a power-consumption prediction value, a plurality of generated-power command patterns are created which are obtained from a combination of a start time and a stop time of the fuel-cell power generation apparatus, and based on a supplied hot-water heat-consumption prediction value, a stored hot-water heat quantity for the predetermined period in a hot-water storage tank which stores warmed water using the heat generated simultaneously with the power generation and supplies the warmed water to the hot-water supply equipment is calculated. Based on the plurality of generated-power command patterns, the stored hot-water heat quantity and the power-consumption prediction value, if the fuel-cell power generation apparatus is operated in each generated-power command pattern, fuel-cell system energy is calculated which indicates the energy of the fuel required in the hot-water supply equipment and electricity required in the electric equipment. In terms of the fuel-cell system energy in each of the plurality of generated-power command patterns, the fuel-cell power generation apparatus is operated in the generated-power command pattern which minimizes the fuel-cell system energy.

Therefore, in terms of the fuel-cell system energy calculated in each of the plurality of generated-power command patterns obtained from a combination of a start time and a stop time of the fuel-cell power generation apparatus, the generated-power command pattern which minimizes the fuel-cell system energy is acquired. At the corresponding start time, the fuel-cell power generation apparatus is started, and it is stopped at the corresponding stop time. Therefore, the fuel-cell power generation apparatus can be efficiently operated according to a power consumption and a supplied hot-water heat consumption which are different in each home. This makes it possible to realize the saving of energy.

Furthermore, in the above described control unit for a fuel-cell power generation apparatus, it is preferable that a conventional system-energy calculating means be further provided for, based on a power-consumption prediction value predicted by the power-consumption predicting means and a supplied hot-water heat-consumption prediction value predicted by the supplied hot-water heat-consumption predicting means, if the fuel-cell power generation apparatus is not operated, calculating conventional system energy which indicates the energy of the fuel required in the hot-water supply equipment and electricity required in the electric equipment; and the fuel-cell operating means operate the fuel-cell power generation apparatus in the generated-power command pattern corresponding to the fuel-cell system energy which maximizes the value left when the fuel-cell system energy in each of the plurality of generated-power command patterns which is calculated by the fuel-cell system-energy calculating means is subtracted from the conventional system energy calculated by the conventional system-energy calculating means.

According to this configuration, based on a power-consumption prediction value and a supplied hot-water heat-consumption prediction value, if the fuel-cell power generation apparatus is not operated, conventional system energy is calculated which indicates the energy of the fuel required in the hot-water supply equipment and electricity required in the electric equipment. Then, the fuel-cell power generation apparatus is operated in the generated-power command pattern corresponding to the fuel-cell system energy which maximizes the value left when the fuel-cell system energy in each of the plurality of generated-power command patterns is subtracted from the conventional system energy.

Therefore, when the fuel-cell power generation apparatus is not operated, from the conventional system energy which indicates the energy of the fuel required in the hot-water supply equipment and electricity required in the electric equipment, the fuel-cell system energy which indicates the energy of the fuel required in the hot-water supply equipment and electricity required in the electric equipment is subtracted when the fuel-cell power generation apparatus is operated in each of the plurality of generated-power command patterns. Then, the fuel-cell power generation apparatus is operated in the generated-power command pattern corresponding to the fuel-cell system energy which maximizes the value obtained by this subtraction. Consequently, the fuel-cell power generation apparatus can be more efficiently operated, taking into account the case where the fuel-cell power generation apparatus is not operated.

Moreover, in the above described control unit for a fuel-cell power generation apparatus, preferably, the power-consumption predicting means and the supplied hot-water heat-consumption predicting means should predict a future power consumption and a future supplied hot-water heat consumption for a predetermined period from a predetermined time, using a neural network model.

According to this configuration, the power-consumption predicting means accumulates a power consumption acquired from the power-amount measuring means. Then, it executes a learning using the neural-network model. Similarly, the supplied hot-water heat-consumption predicting means accumulates a supplied hot-water heat consumption acquired from the supplied hot-water heat-quantity measuring means. Then, it executes a learning using the neural-network model. Consequently, when a prediction is executed, a future power consumption and a future supplied hot-water consumption for a predetermined period from a predetermined time can be predicted.

In addition, in the above described control unit for a fuel-cell power generation apparatus, it is preferable that the predetermined time be zero o'clock and the predetermined period be 24 hours. According to this configuration, using the neural-network model, a future power consumption and a future supplied hot-water heat consumption are predicted over 24 hours from zero o'clock. Thereby, a generated-power command pattern can be created for a whole day. This makes it possible to operate the fuel-cell power generation apparatus in the generated-power command pattern which is most suitable for each day.

Furthermore, in the above described control unit for a fuel-cell power generation apparatus, preferably, the energy calculated by the conventional system-energy calculating means and the fuel-cell system-energy calculating means should be primary energy, and the calculation range should be a predetermined period for which a prediction is executed by the power-consumption predicting means and the supplied hot-water heat-consumption predicting means.

According to this configuration, conventional system energy and fuel-cell system energy are converted into primary energy. Hence, the energy (i.e., the conventional system energy) of the fuel and electricity necessary for the electric equipment, as well as the energy (i.e., the fuel-cell system energy) of the fuel and electricity necessary when the fuel-cell power generation apparatus is operated in each of several generated-power command patterns, can be calculated as energy of the same dimension.

Moreover, in the above described control unit for a fuel-cell power generation apparatus, it is preferable that when calculating the fuel-cell system energy, the fuel-cell system-energy calculating means calculate, in advance, energy necessary for starting the fuel-cell power generation apparatus and add this energy to the fuel-cell system energy.

According to this configuration, when the fuel-cell system energy is calculated, the energy necessary for a start of the fuel-cell power generation apparatus is calculated beforehand. Then, it is added to the fuel-cell system energy. Thereby, taking into account the energy at the time when the fuel-cell power generation apparatus is started, a more precise energy used by the fuel-cell power generation apparatus can be calculated.

In addition, in the above described control unit for a fuel-cell power generation apparatus, preferably: a stopping means should be further provided for stopping the fuel-cell power generation apparatus when the stored hot-water heat quantity of the hot-water storage tank reaches a predetermined value; the generated-power command-pattern creating means should create a real generated-power command pattern when a stop is made by the stopping means except for the stop time; the hot-water storage-tank heat-quantity calculating means should calculate a real stored hot-water heat quantity of the hot-water storage tank by subtracting a radiated-heat quantity from the supplied hot-water heat-consumption prediction value predicted by the supplied hot-water heat-consumption predicting means; and based on the plurality of real generated-power command patterns created by the generated-power command-pattern creating means, the real stored hot-water heat quantity calculated by the hot-water storage-tank heat-quantity calculating means and the power-consumption prediction value predicted by the power-consumption predicting means, if the fuel-cell power generation apparatus is operated in each generated-power command pattern, the fuel-cell system-energy calculating means should calculate fuel-cell system energy which indicates the energy of the fuel required in the hot-water supply equipment and electricity required in the electric equipment.

According to this configuration, if the stored hot-water heat quantity of the hot-water storage tank reaches a predetermined value, the fuel-cell power generation apparatus comes to a halt. Then, a real generated-power command pattern is created which is realized when a stop is made at a time other than the stop time of a generated-power command pattern. Next, a real stored hot-water heat quantity of the hot-water storage tank is calculated which is obtained when a radiated-heat quantity is subtracted from a supplied hot-water heat-consumption prediction value. On the basis of a plurality of such real generated-power command patterns, the real stored hot-water heat quantity and a power-consumption prediction value, if the fuel-cell power generation apparatus is operated in each generated-power command pattern, fuel-cell system energy is calculated which indicates the energy equivalent to the fuel required in the hot-water supply equipment and the electricity required in the electric equipment.

Therefore, except for the stop time of the generated-power command pattern, if the heat quantity of hot water stored in the hot-water storage tank reaches a predetermined value, the fuel-cell power generation apparatus comes to a halt. Taking this case into account, the fuel-cell system energy can be calculated, thus helping determine the generated-power command pattern more precisely.

Furthermore, in the above described control unit for a fuel-cell power generation apparatus, it is preferable that: the hot-water storage-tank heat-quantity calculating means calculate a real stored hot-water heat quantity of the hot-water storage tank by subtracting a radiated-heat quantity from the supplied hot-water heat-consumption prediction value predicted by the supplied hot-water heat-consumption predicting means; and the fuel-cell system-energy calculating means calculate a power loss caused by a radiator which radiates heat when the stored hot-water heat quantity of the hot-water storage tank is equal to, or more than, a predetermined value, and based on the plurality of real generated-power command patterns created by the generated-power command-pattern creating means, the real stored hot-water heat quantity calculated by the hot-water storage-tank heat-quantity calculating means, the power-consumption prediction value predicted by the power-consumption predicting means and the power loss caused by the radiator, if the fuel-cell power generation apparatus is operated in each generated-power command pattern, calculate fuel-cell system energy which indicates the energy of the fuel required in the hot-water supply equipment and electricity required in the electric equipment.

According to this configuration, a real stored hot-water heat quantity of the hot-water storage tank is calculated which is obtained when a radiated-heat quantity is subtracted from a supplied hot-water heat-consumption prediction value. If the stored hot-water heat quantity of the hot-water storage tank is equal to, or above, a predetermined value, then a power loss is calculated which is caused by the heat radiation of the radiator. On the basis of a plurality of such generated-power command patterns, the real stored hot-water heat quantity and a power-consumption prediction value and the power loss, if the fuel-cell power generation apparatus is operated in each generated-power command pattern, fuel-cell system energy is calculated which indicates the energy equivalent to the fuel required in the hot-water supply equipment and the electricity required in the electric equipment.

Therefore, when the hot-water storage tank is filled, in the case where the fuel-cell power generation apparatus keeps operating without stopping while radiating heat using a radiator, the fuel-cell system energy can be calculated, evaluating a power loss caused by operating the radiator. This helps determine the generated-power command pattern more accurately.

Moreover, the above described control unit for a fuel-cell power generation apparatus, preferably, should further include: a prediction-value acquiring means for acquiring a power-consumption prediction value predicted by the power-consumption predicting means, outputting this power-consumption prediction value to the generated-power command-pattern creating means and the fuel-cell system-energy calculating means, acquiring a supplied hot-water heat-consumption prediction value predicted by the supplied hot-water heat-consumption predicting means and outputting this supplied hot-water heat-consumption prediction value to the hot-water storage-tank heat-quantity calculating means; a generated-power adjusting means for predicting an accumulative stored hot-water heat quantity which is accumulated from the current stored hot-water heat quantity based on the power-consumption prediction value predicted by the power-consumption predicting means and the supplied hot-water heat-consumption prediction value predicted by the supplied hot-water heat-consumption predicting means, and adjusting the generated power so that this accumulative stored hot-water heat quantity does not exceed a predetermined maximum stored hot-water heat quantity; and a switching means for outputting the power-consumption prediction value predicted by the power-consumption predicting means and the supplied hot-water heat-consumption prediction value predicted by the supplied hot-water heat-consumption predicting means to either of the prediction-value acquiring means and the generated-power adjusting means.

According to this configuration, a power-consumption prediction value is acquired by the prediction-value acquiring means. The acquired power-consumption prediction value is outputted to the generated-power command-pattern creating means and the fuel-cell system-energy calculating means. Simultaneously, a supplied hot-water heat-consumption prediction value is acquired, and the acquired supplied hot-water heat-consumption prediction value is outputted to the hot-water storage-tank heat-quantity calculating means. In addition, by the generated-power adjusting means, based on the power-consumption prediction value and the supplied hot-water heat-consumption prediction value, an accumulative stored hot-water heat quantity is predicted which is accumulated from the current stored hot-water heat quantity. Then, the generated power is adjusted so that the predicted accumulative stored hot-water heat quantity does not exceed a predetermined maximum stored hot-water heat quantity. Sequentially, by the switching means, the power-consumption prediction value and the supplied hot-water heat-consumption prediction value are outputted to either of the prediction-value acquiring means and the generated-power adjusting means.

Therefore, if the power-consumption prediction value and the supplied hot-water heat-consumption prediction value are outputted to the generated-power adjusting means, the generated power of the fuel-cell power generation apparatus is adjusted, based on the power-consumption prediction value and the supplied hot-water heat-consumption prediction value. Thereby, a power consumption and a supplied hot-water heat consumption different in each home are predicted, so that the generated power of the fuel-cell power generation apparatus can be efficiently controlled. As a result, the fuel-cell power generation apparatus can be continuously operated without being stopped.

The control unit, control method, control program and computer-readable record medium with a control program on record, for a fuel-cell power generation apparatus according to the present invention are capable of operating the fuel-cell power generation apparatus efficiently according to a power consumption and a supplied hot-water heat consumption which are different in each home, and realizing the saving of energy. They are useful as a control unit, a control method, a control program and a computer-readable record medium with a control program on record, for a fuel-cell power generation apparatus, which are used to generate electric power and supply it to electric equipment, and using simultaneously generated heat, supply hot water to hot-water supply equipment. In addition, they can also be used for another power generation apparatus with a mechanical-power generating means such as an engine, or the like.

The invention claimed is:

1. A control unit for a fuel-cell power generation apparatus which generates electric power and heat using a fuel, supplies the electric power to electric equipment, and also uses the heat to supply hot water to hot-water supply equipment, the control unit comprising:

a power-amount measuring section configured to measure a power consumption by the electric equipment;

a power-consumption predicting section configured to predict a future power consumption for a predetermined period from a predetermined time, based on the power consumption measured by the power-amount measuring section;

a supplied hot-water heat-quantity measuring section configured to measure a supplied hot-water heat consumption by the hot-water supply equipment;

a supplied hot-water heat-consumption predicting section configured to predict a future supplied hot-water heat consumption for a predetermined period from a predetermined time, based on the supplied hot-water heat consumption measured by the supplied hot-water heat-quantity measuring section;

a generated-power command-pattern creating section configured to, based on a power-consumption prediction value predicted by the power-consumption predicting section, create a plurality of generated-power command patterns which are obtained from a combination of a start time and a stop time of the fuel-cell power generation apparatus;

a hot-water storage-tank heat-quantity calculating section configured to, based on a supplied hot-water heat-consumption prediction value predicted by the supplied hot-water heat-consumption predicting section, calculate a stored hot-water heat quantity for the predetermined period in a hot-water storage tank which stores warmed water using heat generated simultaneously with the power generation and supplies the warmed water to the hot-water supply equipment;

a fuel-cell system-energy calculating section configured to, based on the plurality of generated-power command patterns created by the generated-power command-pattern creating section, the stored hot-water heat quantity calculated by the hot-water storage-tank heat-quantity calculating section and the power-consumption prediction value predicted by the power-consumption predicting section, calculate fuel-cell system energy which indicates a quantity of the fuel required in the hot-water supply equipment and a quantity of electricity required in the electric equipment in a case where the fuel-cell power generation apparatus is operated in each generated power command pattern, and where electric power supplied from the fuel cell, electric power supplied from an electric-power company, hot water supplied from the hot-water storage-tank, and hot water produced in the hot-water supply equipment are used;

a conventional system-energy calculating section configured to, based on a power-consumption prediction value predicted by the power-consumption predicting section and a supplied hot-water heat-consumption prediction value predicted by the supplied hot-water heat-consumption predicting section, an electricity generation efficiency which indicates a percentage of electric power generated by the electric-power company, and a hot-water supply-equipment efficiency of the hot-water supply equipment producing hot water from water using a fuel, calculate conventional system energy which indicates a quantity of the fuel required in the hot-water supply equipment and a quantity of electricity required in the electric equipment in a case where the fuel-cell power generation apparatus is not operated, and where electric power supplied from the electric-power company and hot water generated in the hot-water supply equipment are used; and a fuel-cell operating section configured to calculate a plurality of subtraction values by subtracting the fuel-cell system energy for each of the plurality of generated-power command patterns which is calculated by the fuel-cell system-energy calculating section from the conventional system energy which is calculated by the conventional system-energy calculating section, to specify a fuel-cell system energy that gives a biggest subtraction value among the plurality of subtraction values, and operate the fuel-cell power generation apparatus in a generated-power command pattern that is used in the calculation of the specified fuel-cell system energy by the fuel-cell system-energy calculating section.

2. The control unit for a fuel-cell power generation apparatus according to claim 1, wherein the power-consumption predicting section and the supplied hot-water heat-consumption predicting section predict a future power consumption and a future supplied hot-water heat consumption for a predetermined period from a predetermined time, using a neural network model.

3. The control unit for a fuel-cell power generation apparatus according to claim 2, wherein the predetermined time is zero o'clock and the predetermined period is 24 hours.

4. The control unit for a fuel-cell power generation apparatus according to claim 1, wherein the energy calculated by the conventional system-energy calculating section and the fuel-cell system-energy calculating section is primary energy, and the calculation range is a predetermined period for which a prediction is executed by the power-consumption predicting section and the supplied hot-water heat-consumption predicting section.

5. The control unit for a fuel-cell power generation apparatus according to claim 1, wherein when calculating the fuel-cell system energy the fuel-cell system-energy calculating section calculates, in advance, energy necessary for starting the fuel-cell power generation apparatus and adds this energy to the fuel-cell system energy.

6. The control unit for a fuel-cell power generation apparatus according to claim 1, further comprising:

a stopping section configured to stop the fuel-cell power generation apparatus when the stored hot-water heat quantity of the hot-water storage tank reaches a predetermined value, wherein the generated-power command-pattern creating section creates a real generated-power command pattern when a stop is made by the stopping section except for the stop time;

the hot-water storage-tank heat-quantity calculating section calculates a real stored hot-water heat quantity of the hot-water storage tank by subtracting a radiated-heat quantity from the supplied hot-water heat-consumption prediction value predicted by the supplied hot-water heat-consumption predicting section; and based on the plurality of real generated-power command patterns created by the generated-power command-pattern creating section, the real stored hot-water heat quantity calculated by the hot-water storage-tank heat-quantity calculating section and the power-consumption prediction value predicted by the power-consumption predicting section, if the fuel-cell power generation apparatus is operated in each generated-power command pattern, the fuel-cell system-energy calculating section calculates fuel-cell system energy which indicates the energy of the fuel required in the hot-water supply equipment and electricity required in the electric equipment.

7. The control unit for a fuel-cell power generation apparatus according to claim 1, wherein the hot-water storage-tank heat-quantity calculating section calculates a real stored hot-water heat quantity of the hot-water storage tank by subtracting a radiated-heat quantity from the supplied hot-water heat-consumption prediction value predicted by the supplied hot-water heat-consumption predicting section; and the fuel-cell system-energy calculating section calculates a power loss caused by a radiator which radiates heat when the stored hot-water heat quantity of the hot-water storage tank is equal to, or more than, a predetermined value, and based on the plurality of generated-power command patterns created by the generated-power command-pattern creating section, the real stored hot-water heat quantity calculated by the hot-water storage-tank heat-quantity calculating section, the power-consumption prediction value predicted by the power-consumption predicting section and the power loss caused by the radiator, if the fuel-cell power generation apparatus is operated in each generated-power command pattern, calculates fuel-cell system energy which indicates the energy of the fuel required in the hot-water supply equipment and electricity required in the electric equipment.

8. The control unit for a fuel-cell power generation apparatus according to claim 1, further comprising:
a prediction-value acquiring section configured to acquire a power-consumption prediction value predicted by the power-consumption predicting section, output this power-consumption prediction value to the generated-power command-pattern creating section and the fuel-cell system-energy calculating section, acquire a supplied hot-water heat-consumption prediction value predicted by the supplied hot-water heat-consumption predicting section and output this supplied hot-water heat-consumption prediction value to the hot-water storage-tank heat-quantity calculating section;
a generated-power adjusting section configured to predict an accumulative stored hot-water heat quantity which is accumulated from the current stored hot-water heat quantity based on the power-consumption prediction value predicted by the power-consumption predicting section and the supplied hot-water heat-consumption prediction value predicted by the supplied hot-water heat-consumption predicting section, and adjust the generated power so that this accumulative stored hot-water heat quantity does not exceed a predetermined maximum stored hot-water heat quantity; and
a switching section configured to output the power-consumption prediction value predicted by the power-consumption predicting section and the supplied hot-water heat-consumption prediction value predicted by the supplied hot-water heat-consumption predicting section to either of the prediction-value acquiring section and a generated-power adjusting section.

9. A control method for a fuel-cell power generation apparatus in which electric power supplied to electric equipment is generated using a fuel, and using simultaneously generated heat, hot water is supplied to hot-water supply equipment, the control method comprising:
measuring a power consumption consumed by the electric equipment;
predicting a future power consumption for a predetermined period from a predetermined time, based on the measured power consumption;
measuring a supplied hot-water heat consumption by the hot-water supply equipment;
predicting a future supplied hot-water heat consumption for a predetermined period from a predetermined time, based on the measured supplied hot-water heat consumption;
based on a predicted power-consumption prediction value, creating a plurality of generated-power command patterns which are obtained from a combination of a start time and a stop time of the fuel-cell power generation apparatus;
based on a predicted supplied hot-water heat-consumption prediction value, calculating a stored hot-water heat quantity for the predetermined period in a hot-water storage tank which stores warmed water using heat generated simultaneously with the power generation and supplies the warmed water to the hot-water supply equipment;
based on the created plurality of generated-power command patterns, the calculated stored hot-water heat quantity and the predicted power-consumption prediction value, calculating fuel-cell system energy which indicates a quantity of the fuel required in the hot-water supply equipment and a quantity of electricity required in the electric equipment in a case where the fuel-cell power generation apparatus is operated in each generated power command pattern, and where electric power supplied from the fuel cell, electric power supplied from an electric power company, hot water supplied from the hot-water storage-tank, and hot water produced in the hot-water supply equipment are used;
based on a predicted power-consumption prediction value and a predicted supplied hot-water heat-consumption prediction value, an electricity generation efficiency which indicates a percentage of electric power generated by the electric-power company, and a hot-water supply-equipment efficiency of the hot-water supply equipment producing hot water from water using a fuel, calculating conventional system energy which indicates a quantity of the fuel required in the hot-water supply equipment and a quantity of electricity required in the electric equipment in a case where the fuel-cell power generation apparatus is not operated, and where electric power supplied from the electric-power company and hot water generated in the hot-water supply equipment are used; and
calculating a plurality of subtraction values by subtracting the calculated fuel-cell system energy for each of the plurality of generated-power command patterns from the calculated conventional system energy, to specify a fuel-cell system energy that gives a biggest subtraction value among the plurality of subtraction values, and operating the fuel-cell power generation apparatus in a generated-power command pattern that is used in the calculation of the specified fuel-cell system energy.

10. A non-transitory computer-readable recording medium storing a control program for a fuel-cell power generation apparatus by which electric power supplied to electric equipment is generated using a fuel, and using simultaneously generated heat, hot water is supplied to hot-water supply equipment, the control program causing a computer to function as:
a power-amount measuring section configured to measure a power consumption by the electric equipment;
a power-consumption predicting section configured to predict a future power consumption for a predetermined period from a predetermined time, based on the power consumption measured by the power-amount measuring section;
a supplied hot-water heat-quantity measuring section configured to measure a supplied hot-water heat consumption by the hot-water supply equipment;
a supplied hot-water heat-consumption predicting section configured to predict a future supplied hot-water heat consumption for a predetermined period from a predetermined time, based on the supplied hot-water heat consumption measured by the supplied hot-water heat-quantity measuring section;
a generated-power command-pattern creating section configured to, based on a power-consumption prediction value predicted by the power-consumption predicting section, create a plurality of generated-power command patterns which are obtained from a combination of a start time and a stop time of the fuel-cell power generation apparatus;
a hot-water storage-tank heat-quantity calculating section configured to, based on a supplied hot-water heat-consumption prediction value predicted by the supplied hot-water heat-consumption predicting section, calculate a stored hot-water heat quantity for the predetermined period in a hot-water storage tank which stores warmed water using heat generated simultaneously with the power generation and supplies the warmed water to the hot-water supply equipment;

a fuel-cell system-energy calculating section configured to, based on the plurality of generated-power command patterns created by the generated-power command-pattern creating section, the stored hot-water heat quantity calculated by the hot-water storage-tank heat-quantity calculating section and the power-consumption prediction value predicted by the power-consumption predicting section, calculate fuel-cell system energy which indicates a quantity of the fuel required in the hot-water supply equipment and a quantity of electricity required in the electric equipment in a case where the fuel-cell power generation apparatus is operated in each generated power command pattern, and where electric power supplied form the fuel cell, electric power supplied from an electric-power company, hot water supplied from the hot-water storage-tank, and hot water produced in the hot-water supply equipment are used;

a conventional system-energy calculating section configured to, based on a power-consumption prediction value predicted by the power-consumption predicting section, a supplied hot-water heat-consumption prediction value predicted by the supplied hot-water heat-consumption predicting section, an electricity generation efficiency which indicates a percentage of electric power generated by the electric-power company, and a hot-water supply-equipment efficiency of the hot-water supply equipment producing hot water from water using a fuel, calculate conventional system energy which indicates a quantity of the fuel required in the hot-water supply equipment and a quantity of electricity required in the electric equipment in a case where the fuel-cell power generation apparatus is not operated, and where electric power supplied from the electric-power company and hot water generated in the hot-water supply equipment are used; and a fuel-cell operating section configured to calculate a plurality of subtraction values by subtracting the fuel-cell system energy for each of the plurality of generated-power command patterns which is calculated by the fuel-cell system-energy calculating section from the conventional system energy which is calculated by the conventional system-energy calculating section, to specify a fuel-cell system energy that gives a biggest subtraction value among the plurality of subtraction values, and operate the fuel-cell power generation apparatus in a generated-power command pattern that is used in the calculation of the specified fuel-cell system energy by the fuel-cell system-energy calculating section.

* * * * *